United States Patent
Greiner et al.

(10) Patent No.: US 6,823,115 B2
(45) Date of Patent: Nov. 23, 2004

(54) OPTICAL STRUCTURES DISTRIBUTED AMONG MULTIPLE OPTICAL WAVEGUIDES

(76) Inventors: Christoph M. Greiner, c/o LightSmyth Technologies, 860 W. Park, Suite 250, Eugene, OR (US) 97401; Thomas W. Mossberg, c/o LightSmyth Technologies, 860 W. Park, Suite 250, Eugene, OR (US) 97401; Dmitri Iazikov, c/o LightSmyth Technologies, 860 W. Park, Suite 250, Springfield, OR (US) 97401

( * ) Notice: Subject to any disclaimer, the term of this patent is extended or adjusted under 35 U.S.C. 154(b) by 0 days.

(21) Appl. No.: 10/798,089

(22) Filed: Mar. 10, 2004

(65) Prior Publication Data

US 2004/0179779 A1 Sep. 16, 2004

Related U.S. Application Data

(60) Provisional application No. 60/453,557, filed on Mar. 10, 2003.

(51) Int. Cl.[7] .................................................. G02B 6/34
(52) U.S. Cl. ................................ 385/37; 385/10; 385/3; 385/14
(58) Field of Search .............................. 385/1, 3, 8–10, 385/14, 36, 37, 123; 359/565, 566, 569, 570, 576

(56) References Cited

U.S. PATENT DOCUMENTS 6,678,429 B2 * 1/2004 Mossberg et al. ............. 385/10
2004/0076374 A1 * 4/2004 Greiner et al. ................ 385/37

* cited by examiner

Primary Examiner—Phan T. H. Palmer
(74) Attorney, Agent, or Firm—David S. Alavi

(57) ABSTRACT

An optical apparatus comprises an optical element having at least one set of diffractive elements and multiple channel optical waveguides. Diffractive elements of each set are distributed among diffractive element subsets corresponding to each of the multiple channel waveguides. Each diffractive element set routes, between a corresponding pair of optical ports, those corresponding portions of an optical signal propagating within the optical element that are received by multiple channel waveguides and back-diffracted within the receiving channel waveguides by corresponding diffractive element subsets. The channel optical waveguides are arranged so that optical signals propagate through regions of the optical element between the ports and the first ends of the channel waveguides. Relative spatial arrangement of the first ends of the channel waveguides and corresponding relative phase shifts imparted in the channel waveguides define at least in part a relative spatial arrangement of the corresponding pair of optical ports.

58 Claims, 18 Drawing Sheets

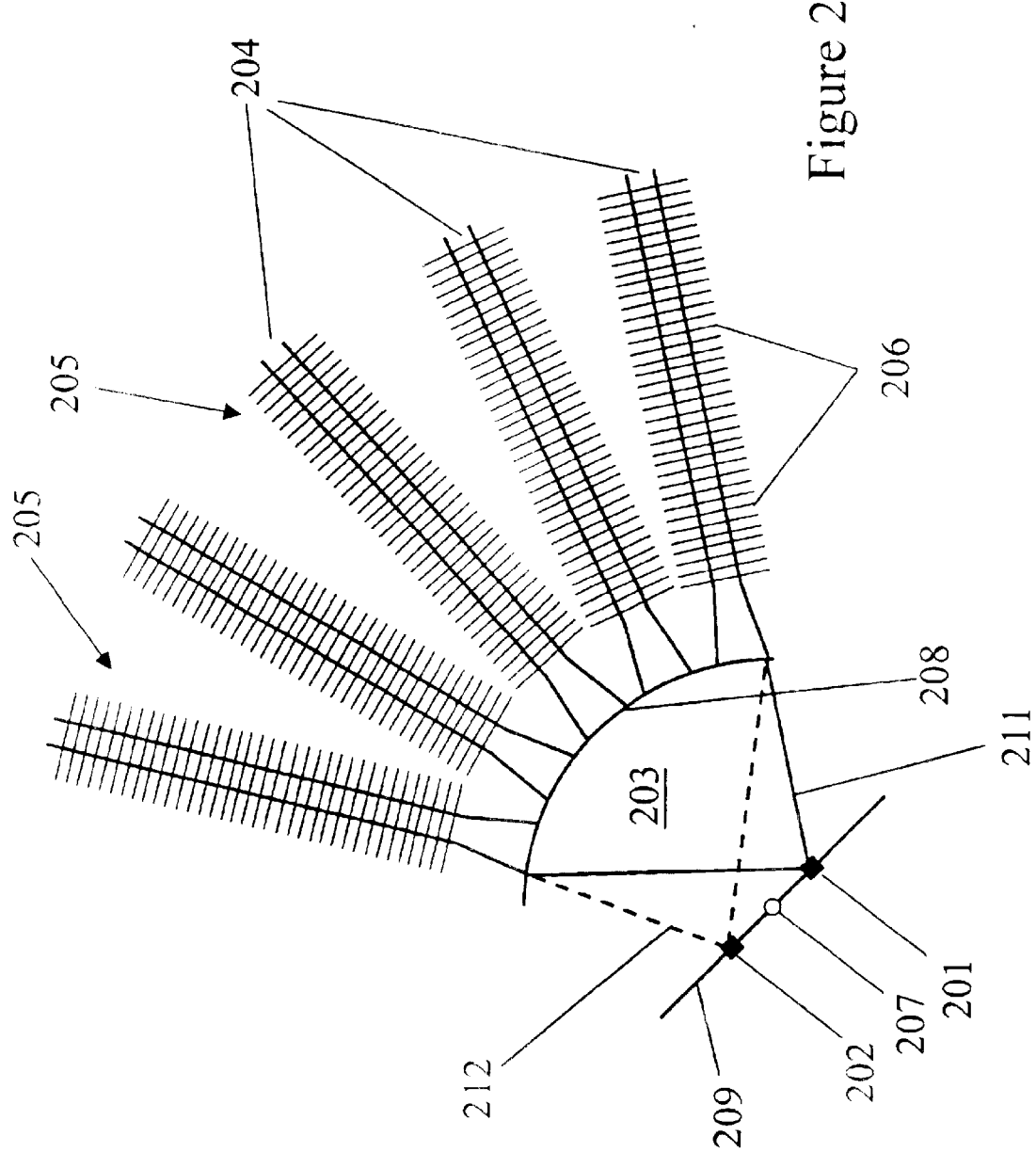

OPTICAL STRUCTURES DISTRIBUTED AMONG MULTIPLE OPTICAL WAVEGUIDES

RELATED APPLICATIONS

This application claims benefit of prior-filed co-pending provisional App. No. 60/453,557 entitled "Method and apparatus for waveguide-sampling of holographic spectral filters" filed Mar. 10, 2003 In the names of Christoph M. Greiner, Thomas W. Mossberg, and Dmitri Iazikov, said provisional patent application being hereby incorporated by reference as if fully set forth herein.

BACKGROUND

The field of the present invention relates to optical devices incorporating distributed optical structures. In particular, distributed optical structures with diffractive elements thereof distributed among multiple channel waveguides of an optical apparatus are disclosed herein.

An optical apparatus comprising an optical element having one or more distributed optical structures (i.e., one or more sets of diffractive elements) may be configured to provide a variety of optical functionality, including spectral filtering, temporal encoding, and others. Such devices, if single mode, may enable nearly complete control of amplitude and phase of optical signals to achieve filtering, encoding, routing, and other functions. Multimode devices may enable similar control. Examples of such devices may be found in the references cited herein.

This application may be related to subject matter disclosed in: non-provisional application Ser. No. 09/811,081 entitled "Holographic spectral filter" filed Mar. 16, 2001 in the name of Thomas W. Mossberg; provisional App. No. 60/190,126 filed Mar. 16, 2000; provisional App. No. 60/199,790 filed Apr. 26, 2000; provisional App. No. 60/235,330 filed Sep. 26, 2000; provisional App. No. 60/247,231 filed Nov. 10, 2000; non-provisional application Ser. No. 10/653,876 entitled "Amplitude and phase control in distributed optical structures" filed Sep. 2, 2003 in the names of Christoph M. Greiner, Dmitri Iazikov, and Thomas W. Mossberg; non-provisional application Ser. No. 10/229,444 entitled "Amplitude and phase control in distributed optical structures" filed Aug. 27, 2002 in the names of Thomas W. Mossberg and Christoph M. Greiner, now U.S. Pat. No. 6,678,429 issued Jan. 13, 2004; provisional App. No. 60/315,302 filed Aug. 27, 2001; provisional App. No. 60/370,182 filed Apr. 4, 2002; provisional App. No. 60/468,479 filed May 7, 2003; provisional App. No. 60/486,450 filed Jul. 10, 2003; non-provisional application Ser. No. 10/794,634 entitled "Temperature-compensated planar waveguide optical apparatus" filed Mar. 5, 2004 in the names of Dmitri Iazikov, Thomas W. Mossberg, and Christoph M. Greiner; and provisional App. No. 60/452,834 filed Mar. 6, 2003. Each of said patent and said provisional and non-provisional patent applications is hereby incorporated by reference as if fully set forth herein.

SUMMARY

An optical apparatus comprises an optical element having formed therein at least one set of diffractive elements and at least two channel optical waveguides. Each channel optical waveguide substantially confines in two transverse spatial dimensions an optical signal propagating therein. Diffractive elements of each set of diffractive elements are distributed among diffractive element subsets corresponding to each of the multiple channel waveguides. Each diffractive element set routes, between a corresponding pair of optical ports, those corresponding portions of an optical signal propagating within the optical element that are received by multiple channel waveguides and back-diffracted within the receiving channel waveguides by corresponding diffractive element subsets. The channel optical waveguides are arranged so that an optical signal entering the optical element at an input optical port first propagates through a region of the optical element between the input optical port and the first ends of the channel waveguides and is then incident on and received at least in part by multiple channel optical waveguides. The channel optical waveguides are arranged so that the corresponding routed portions of optical signal exiting the optical element at an output optical port first propagate through a region of the optical element between the first ends of the channel waveguides and the output optical port.

Channel waveguides may route, between a corresponding pair of optical ports, portions of an optical signal transmitted by the diffractive element subsets, by redirection therein or transmission therethrough. Relative spatial arrangement of the ends of the channel waveguides and corresponding relative phase shifts imparted on back-diffracted portions, transmitted portions, and/or redirected portions of the optical signal in the channel waveguides may define at least in part a relative spatial arrangement of corresponding pairs of optical ports. The ends of the channel waveguides may be curved, flared, tapered, segmented, or otherwise adapted for optical coupling. Relative phase shifts may be imparted by waveguide position, length, modal index, longitudinal positions of diffractive element subsets, static phase shifters, phase modulators, and so forth. The arrangement of the diffractive elements may determine at least in part spectral and/or temporal characteristics of the optical apparatus, which may be substantially independent of temperature and/or polarization, or may exhibit designed dependence(s) on temperature and/or polarization. The optical apparatus may include multiple sets of diffractive elements. Routing of optical signals may be imaged, or non-imaged. Two or more similar optical devices may be cascaded, optical output of one device serving as optical input of another.

Objects and advantages pertaining to optical structures distributed among multiple optical waveguides may become apparent upon referring to the disclosed embodiments as illustrated in the drawings and disclosed in the following written description and/or claims.

BRIEF DESCRIPTION OF THE DRAWINGS

FIG. 2 is a schematic top view of an optical device with diffractive elements and channel waveguides.

Figure 1A:
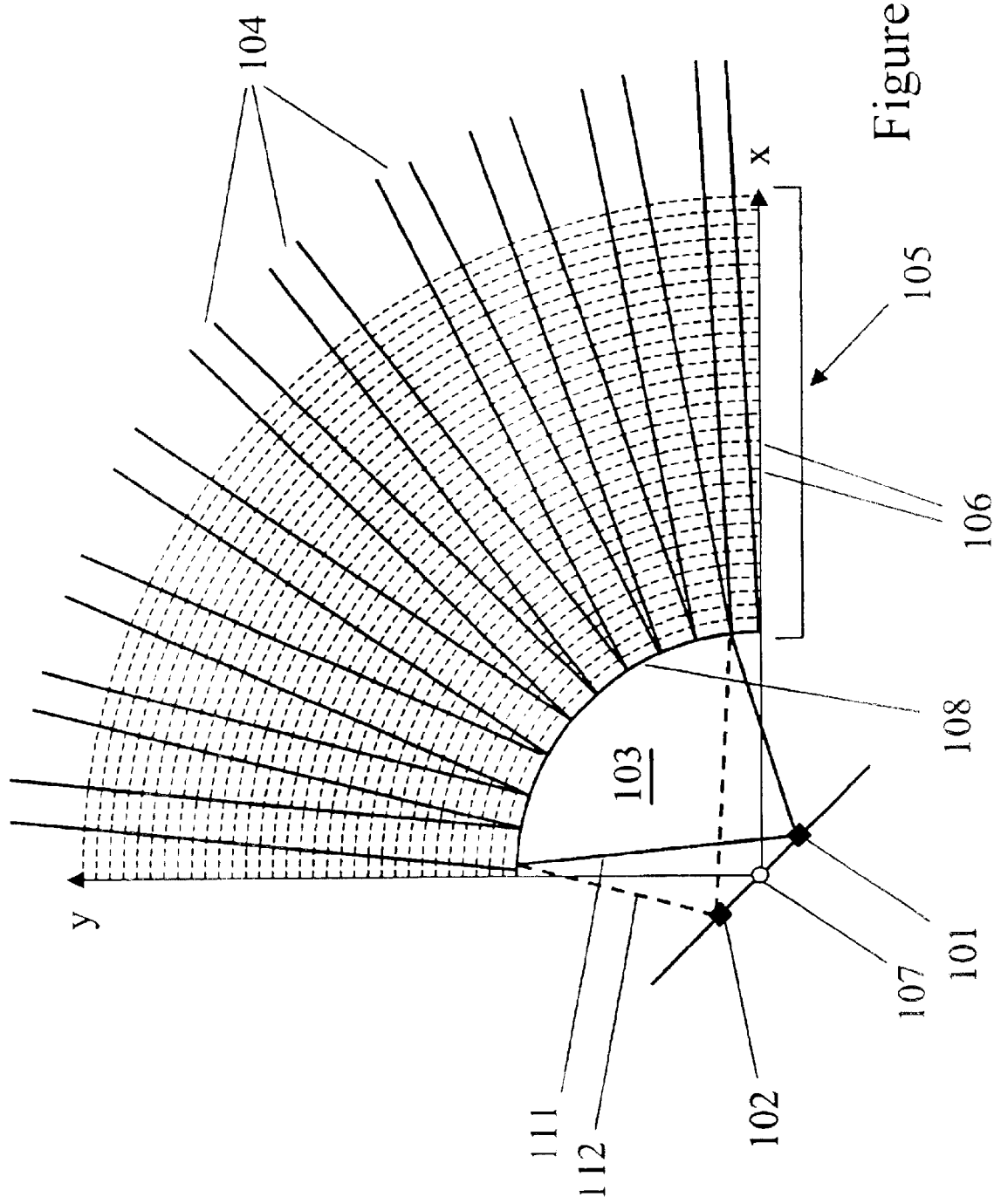
FIGS. 1A and 1B are schematic top views of an optical device with diffractive elements and channel waveguides.

The embodiments shown in the Figures are exemplary, and should not be construed as limiting the scope of the present disclosure and/or appended claims.

DETAILED DESCRIPTION OF EMBODIMENTS

An optical apparatus according to the present disclosure comprises an optical element having formed therein at least one set of diffractive elements and at least two channel optical waveguides. Each channel optical waveguide substantially confines in two transverse spatial dimensions an optical signal propagating therein. Diffractive elements of each set of diffractive elements are distributed among diffractive element subsets corresponding to each of at least two of the multiple channel waveguides. Each diffractive element set routes, between a corresponding pair of optical ports, those corresponding portions of an optical signal propagating within the optical element that are received by multiple channel waveguides and back-diffracted within the receiving channel waveguides by interaction between corresponding diffractive element subsets and optical modes supported by the channel waveguides. The channel optical waveguides are arranged so that an optical signal entering the optical element at an input optical port first propagates through a region of the optical element between the input optical port and the first ends of the channel waveguides and is then incident on and received at least in part by multiple channel optical waveguides (into one or more corresponding optical modes thereof). The channel optical waveguides are arranged so that the corresponding routed portions of optical signal exiting the optical element at an output optical port first propagate through a region of the optical element between the first ends of the channel waveguides and the output optical port. In some instances optical signals may propagate in three dimensions in these region(s); in other instances these region(s) may comprise optical slab waveguide(s) (which substantially confine in one transverse spatial dimension optical signals propagating in two dimensions therein).

The channel waveguides (and slab waveguide(s), if present) typically comprise a core surrounded by lower-index cladding. The core is fabricated using one or more dielectric materials substantially transparent over a desired operating wavelength range. In some instances the cladding may include vacuum, air, or other ambient atmosphere. More typically, the cladding comprises dielectric material(s). In some instances in which short optical paths are employed and some degree of optical loss can be tolerated, the cladding indices might be larger than the core index while still enabling the planar waveguide to support guided, albeit lossy, optical modes. If slab waveguide(s) are employed, the slab waveguide(s) and the channel waveguides may be formed on or secured to a common substrate, for facilitating manufacture, for mechanical support, and/or for other reasons.

Any of various suitable methods, including those known in the art, may be employed to improve coupling of optical signals between optical modes supported by the channel waveguides and optical modes propagating between optical ports and the first ends of the channel waveguides (i.e. through the port-to-waveguide region). Such methods may include, for example, mode-matching techniques, wherein refractive indices and/or waveguide core/cladding dimensions may be suitably altered in the channel waveguide(s) and/or in the port-to-waveguide region so as improve mode-matching between the respective spatial modes. This may including flaring or tapering of the channel waveguide cores at the first ends thereof, for example. If core and/or cladding material(s) comprising the channel waveguides differ in refractive index from material in the port-to-waveguide region, then curvature of the interface(s) between these materials may be employed for improving mode matching. In other examples, mode-matching may be improved by suitably configured segmented cores of the channel waveguides (formed, for example, by removing intervening segments of the core during fabrication) or by longitudinally varying core and/or cladding indices.

The set of diffractive elements of the optical apparatus may also be referred to as: a distributed optical structure; a set of holographic elements; a volume hologram; a distributed reflective element, distributed reflector, or distributed Bragg reflector (DBR); a Bragg reflective grating (BRG); a holographic Bragg reflector (HBR); a distributed Bragg structure; a mode-selective photonic bandgap crystal; a directional photonic bandgap material; or other equivalent terms of art. Each diffractive element of the set diffracts, reflects, scatters, or otherwise redirects a portion of an incident optical signal (said process hereinafter simply referred to as diffraction). Each diffractive element of the set typically comprises some suitable alteration of the planar waveguide (ridge, groove, index modulation, density modulation, and so on). In the absence of the multiple channel waveguides, each diffractive element may be spatially defined by a virtual diffractive element contour, the shape of the contour typically being configured to impart desired spatial characteristics onto the diffracted portions of the optical signal. These may be 2D linear and/or curvilinear contours in a channel or slab waveguide, or 3D areal contours in a three dimensional optical component. In the presence of multiple channel waveguides, the diffractive elements may or may not be defined by corresponding virtual contours.

The diffractive elements of the set are spatially arranged with respect to one another so that the corresponding portions of the optical signal diffracted by each element interfere with one another, so as to impart desired spectral and/or temporal characteristics onto the portion of the optical signal collectively diffracted from the set of diffractive elements. The diffractive elements in the set are arranged so that an optical signal, entering through an input optical port, is successively incident on diffractive elements of the set, with a fraction of the incident amplitude diffracted by a diffractive element while the remainder is transmitted and incident on another diffractive element, and so on successively through the set of diffractive elements. The diffractive elements are therefore spaced substantially longitudinally along the propagation direction of the incident optical signal (in contrast to a traditional surface or thin diffraction grating, in which the diffractive elements, i.e. grating lines, are spaced transversely across the wavefront of the incident optical signal). If no channel waveguides are present, each diffractive element is shaped to direct or route its diffracted portion of the optical signal between optical ports, typically (but not necessarily) propagating back through earlier diffractive elements of the set. If channel waveguides are present, the relative spatial arrangement of the first ends of the channel waveguides and the spatial arrangement of the diffractive elements determine the routing of diffracted portions of an optical signal between optical ports. In either case (channel waveguides present or not), the relative spatial arrangement (including the longitudinal spacing) of the diffractive elements of the set yields desired spectral and/or temporal characteristics for the portion of an optical signal routed between corresponding optical ports. For a three-dimensional optical element, single-mode slab waveguide, or single-mode channel waveguide, such a set of diffractive elements may be arranged to yield an arbitrary spectral transfer function (in terms of amplitude and phase). In a multimode waveguide, modal dispersion and mode-to-mode coupling of diffracted portions of the optical signal may limit the range of spectral transfer functions that may be implemented.

It should be noted that optical ports (input and/or output) may be defined structurally (for example, by an aperture, waveguide, fiber, lens, or other optical component) and/or functionally (i.e., by a spatial location, convergence/divergence/collimation, and/or propagation direction). While exemplary embodiments shown and/or described herein maybe shown with routed optical signals imaged between corresponding optical ports (i.e., focused optical beams at the ports), this need not be the case. Any suitable optical port configuration, structural and/or functional, may be employed in the implementation of an optical device according to the present disclosure. It should also be noted that optical devices as disclosed herein may be cascaded, with an output optical port of one device coupled to, or serving as, an input optical port of another similar device.

An optical apparatus of the present disclosure may be conveniently described in one of two ways: i) as a modification of a slab waveguide embodiment or a three dimensional embodiment, wherein the 2D or 3D diffractive elements are "sampled" by multiple channel waveguides formed in the optical element; or ii) as a collection of multiple channel waveguide embodiments, each having diffractive elements, that collectively route an optical signal. It should be noted that these differing descriptive schemes, while similar, may suggest alternative schemes for fabricating optical devices according to the present disclosure. However, description of devices or embodiments according to one of these schemes or the other shall not be construed as limiting the scope of the present disclosure or appended claims.

In an optical apparatus according to the present disclosure described according to the first descriptive scheme, an optical element (a slab waveguide, for example; the following discussion may be readily adapted to describe a 3D embodiment as well) has a set of diffractive elements defined by corresponding 2D linear and/or curvilinear contours. The elements/contours are arranged to route a diffracted portion of an optical signal between corresponding optical ports of the apparatus. Multiple channel waveguides are formed that each substantially span at least the region of the slab waveguide where the diffractive elements are located. The channel waveguides are arranged so that the incident optical signal, after entering the apparatus at an input optical port and propagating through a region of the slab waveguide, is received by the channel waveguides and divided among them. Each portion of the divided optical signal propagates within the corresponding channel waveguide and interacts with the segments of the diffractive elements that at least partly spatially overlap optical mode(s) supported by the channel waveguide. Corresponding portions of the optical signal may be back-diffracted within corresponding channel waveguides by the diffractive elements, and the back-diffracted portions are emitted from the channel waveguides. The back-diffracted and emitted portions of the optical signal propagate through a region of the slab waveguide and then exit at an output optical port.

If channel waveguides are not present, the optical signal propagates freely (in two unconfined dimensions in a slab waveguide; the following discussion may be readily generalized to 3D optical elements with areal diffractive elements), and interacts with extended portions of each diffractive element. The 2D linear and/or curvilinear shapes of the diffractive elements impart spatial characteristics onto the back-diffracted portion of the optical signal and determine the relative spatial arrangement of the input and output optical ports. With the channel waveguides present, however, only segments of the diffractive elements that at least partly spatially overlap optical mode(s) supported by the channel waveguides (i.e., that are "sampled" by optical mode(s) of the channel waveguides) interact with the optical signal to back-diffract a portion thereof. Spatial characteristics of the back-diffracted optical signal and relative spatial arrangement of the optical ports depend not only on the positions of the diffractive elements along the channel waveguides, but also on the relative spatial arrangement of the first ends of the channel waveguides. It should be noted that portions of the diffractive elements that are not thus sampled by a channel waveguide optical mode need not be present in the optical element. Diffractive elements that are sampled may be further altered, and/or some of them removed altogether, so as to alter interactions with channel waveguide optical modes. This is described further hereinbelow.

When forming (designing and/or fabricating) a waveguide-sampled optical structure from an originally fully 2D set of diffractive elements, care should be taken to accurately translate the original spectral, temporal, and/or spatial properties of the 2D structure into the waveguide-sampled structure. This may include appropriately adjusting the effective modal index of the channel waveguides (by means know in the art) or the diffractive element spacing when sampling the 2D structure, since the indices of the slab waveguide and the channel waveguides may differ. Also, any apodization methods applicable to spatially extended 2D structures (and described in the cited references) may not be realizable in channel waveguides, and/or may require replacement by other apodization schemes more suitable for diffractive element sets in channel waveguides. For example partial contour writing may be used to apodize the spectral/temporal characteristics of an originally 2D diffractive structure (disclosed in detail in the cited references). When a partially-written length of a diffractive element contour exceeds the transverse extent of the channel waveguide optical mode, this apodization approach would not be effective. Additional adaptations may be required for sampling an originally 2D diffractive element set with multiple channel waveguides, any suitable adaptation shall fall within the scope of the present disclosure and/or appended claims.

The specific manner in which the multiple channel waveguides sample an original 2D distributed optical structure may also provide a way to alter the spectral and/or temporal response of the sampled structure. For example, substantially uniformly spaced diffractive contours may be sampled by a curved waveguide (making an angle with the diffractive elements that is sufficiently small so that functionally significant fractions of light are back-diffracted into a channel waveguide optical mode), thus effectively creating a chirped diffractive element set for the waveguide. This approach may provide a useful pathway for achieving phase apodization when sampling 2D structures. This may be useful for distributed optical structures that are not formed by lithography, but are instead formed using methods that do not necessarily provide adequate control over individual element spacings (such as structures formed interferometrically, for example). Sampling such 2D distributed optical structures at appropriate angles and/or with appropriate curvatures may represent an effective way to implement phase apodization.

In an optical apparatus according to the present disclosure described according to the second descriptive scheme, an optical element has multiple channel waveguides formed therein and a slab waveguide region. (The following discussion may be readily adapted to describe a 3D embodiment as well). The channel waveguides are arranged so that the incident optical signal, after entering the apparatus at an input optical port and propagating through a region of the slab waveguide (propagating in two unconfined spatial dimensions), is received by the channel waveguides and divided among them. The optical element has a set of diffractive elements, which are distributed among subsets corresponding to the channel waveguides. The diffractive elements are arranged to route a diffracted portion of an optical signal between corresponding optical ports of the apparatus. Each portion of the divided optical signal propagates within the corresponding channel waveguide and interacts with the corresponding subset of the diffractive elements. Corresponding portions of the optical signal may be back-diffracted within corresponding channel waveguides by the diffractive element subsets, and the back-diffracted portions are emitted from the channel waveguides. The back-diffracted and emitted portions of the optical signal propagate through a region of the slab waveguide and then exit at an output optical port. Diffractive elements belonging to distinct diffractive element subsets may comprise distinct elements, or may comprise distinct portions of a diffractive element that intersects multiple channel waveguides.

The set of diffractive elements of the optical apparatus imparts designed spectral and/or temporal characteristics onto the diffracted portion of the optical signal. Spatial routing of the diffracted portion of the optical signal between optical ports is determined by the relative spatial arrangement of the first ends of the multiple channel optical waveguides, as well as the arrangement of the diffractive element subsets thereof. The arrangement of channel waveguides and diffractive elements may be designed (by computer generation, for example) so as to provide optimal routing, imaging, or focusing of the optical signal between an input optical port and a desired output optical port, thus reducing or minimizing insertion loss of the apparatus. A wide range of fabrication techniques may be employed for forming sets of diffractive elements and channel waveguides of various sorts, and any suitable technique(s) may be employed while remaining within the scope of the present disclosure and/or appended claims. The following are exemplary only, and are not intended to be exhaustive.

Diffractive elements may be formed lithographically on the surface of a slab or channel optical waveguide, or at one or both interfaces between core and cladding of such waveguides. Diffractive elements may take the form of trenches or ribs at the surface of the core, with material of differing index filling the trenches or the spaces between the ribs (the filling material may be cladding material, or some other optical material). Diffractive elements may be formed lithographically in the interior of the core layer of the waveguide using one or more spatial lithography steps performed after an initial partial deposition of the core layer material. Diffractive elements may be formed by projecting ultraviolet light or other suitable radiation through an amplitude and/or phase mask so as to create an interference pattern within the waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter.

The two descriptive schemes may suggest distinct approaches for fabricating an optical apparatus according to the present disclosure. It may be advantageous in some circumstances to first form the set of channel waveguides and then form the diffractive elements, while in other circumstances it may be advantageous to first from the diffractive elements, and then form the channel waveguides. In some circumstances, it may be advantageous to form the diffractive elements as full 2D or 3D contours that are "sampled" by the channel waveguides, while in other instances it may be advantageous to only form diffractive elements at locations where they would interact with optical modes supported by the channel waveguides. Any of these fabrication schemes, as well as other suitable fabrication schemes, shall fall within the scope of the present disclosure and/or appended claims.

FIG. 1A is a schematic top view of an exemplary two-dimensional slab waveguide structure. The waveguide lies in the plane defined by the x-axis and y-axis shown in FIG. 1A. The waveguide structure, specifically its core, occupies a certain region of the xy-plane and has a thickness $\Delta z$. The diffractive elements contours 106 (substantially concentric arcs in this example centered at 107), that constitute a distributed optical structure 105, may comprise trenches or ribs in the core layer or may comprise bulk refractive index changes in the core material induced by optical exposure or other means. For a single-mode slab waveguide, the thickness $\Delta z$ is typically 1 to 8 times the in-medium design wavelength of the device. For a multimode slab waveguide, $\Delta z$ may be on the order of 30 to 60 times the in-medium design wavelength of the device. At a typical telecommunications wavelengths ($\lambda_{air}$~1.5 $\mu$m), the thickness of the planar waveguide may be about 4 $\mu$m if the waveguide medium is silica and single-mode operation is desired, for example.

In FIG. 1A, light enters the planar waveguide from an optical port 101. Optical port 101 may comprise a channel waveguide, an edge mounted optical fiber, the focal spot of a free-space light source, or other suitable component and/or arrangement. The entering optical signal (diverging input beam 111) propagates and expands (in the xy-plane) in slab waveguide region 103. At the end of region 103, the input beam 111 is incident on and received by a manifold of channel waveguides 104, which in this example form a dense waveguide array that samples the distributed optical structure 105. Portions of the optical signal propagating in the channel waveguides interact with and are back-diffracted from the distributed optical structure 105 where the elements thereof at least partly overlap optical modes supported by the channel waveguides. The first ends of channel waveguides 104 are arranged on a virtual contour 108, which is defined so that light emitted from the channel waveguides (having been back-diffracted within the channel waveguides by the distributed optical structure) forms an output beam 112 that exits the device via output port 102. At output port 102 the portion of the optical signal thus routed by the diffractive element set may enter a channel waveguide, an optical fiber, a free space optical assembly, or other output apparatus. In forming channel waveguides 104, lateral optical confinement may be achieved by removal of core material from regions between the channel waveguides (by etching or other suitable processes), or lateral optical confinement may be provided using any other suitable fabrication scheme. Portions of distributed optical structure 105 that lie between channel waveguides 104 may be removed or left in place, as needed or desired (left in place in the exemplary embodiment of FIG. 1). Core and/or cladding materials forming slab waveguide region 103 may be the same as those forming channel waveguides 104, or they may differ.

The virtual contour 108 for locating the ends of the channel waveguides 104 may be chosen so as to spatially redirect the wave front of the input signal to the output port 102. In this example, the contour 108 is a circular are substantially concentric with the contours of distributed optical structure 105 (centered at 107, approximately midway between the ports 101 and 102). Such a contour may provide (approximately) unit-conjugate-ratio imaging between the optical ports. A circular contour does not provide optimal mapping of the input wavefront to the output port, and better optimized contours may be designed, for example in a manner similar to the design of aspheric reflective optics. For example, segments of an ellipse may serve as contour 108, with optical ports 101 and 102 located at the ellipse foci. An imaging contour (with focused optical beams at the optical ports) is not necessarily required. Any suitable beam size, shape, divergence, convergence, collimation, and/or propagation direction may be implemented by suitably configuring virtual contour 108 and the ends of channel waveguides 104, and such implementations shall fall within the scope of the present disclosure and/or appended claims. In this exemplary embodiment, the channel waveguides are spaced with equal angular displacement about a common intersection point coincident with the center of curvature 107, so that if extended from contour 108 they would contain point 107. Other suitable angular spacings, including irregular angular spacings, shall fall within the scope of the present disclosure and/or appended claims.

As further described hereinbelow, it is the port-to-port relative phases of the portions of the optical signal back-diffracted from the diffractive element subsets that determine (along with the spatial characteristics of the input optical signal and the channel waveguide optical modes) the spatial properties of the optical output of the device. A virtual contour (such as contour 108) is merely a convenient reference from which to measure such relative phase shifts. Port-to-port relative phase shifts include port-to-waveguide phase shifts, phase shifts imparted by the waveguides, and waveguide-to-port phase shifts. A virtual contour, if applicable to a particular embodiment, may characterize the port-to-waveguide and waveguide-to-port phase shifts for the back-diffracted portion of the optical signal. The exemplary embodiments disclosed herein are shown with virtual contours defined by the ends of the channel waveguides. However, embodiments for which such a contour has not been defined, or for which such a contour may not be appropriate, shall fall within the scope of the present disclosure and/or appended claims.

A distributed optical structure implemented in multiple channel optical waveguides may exhibit polarization-dependent spectral, temporal, or other optical properties (or lack thereof) that differ in polarization dependence from properties of such structures implemented in a slab waveguide. These differences may be exploited for imparting a design polarization dependence into an optical device, or for reducing or substantially eliminating polarization dependent optical device properties. Use of channel waveguides may facilitate reduction or substantial elimination of such polarization dependences, if needed or desired.

Figure 1B:
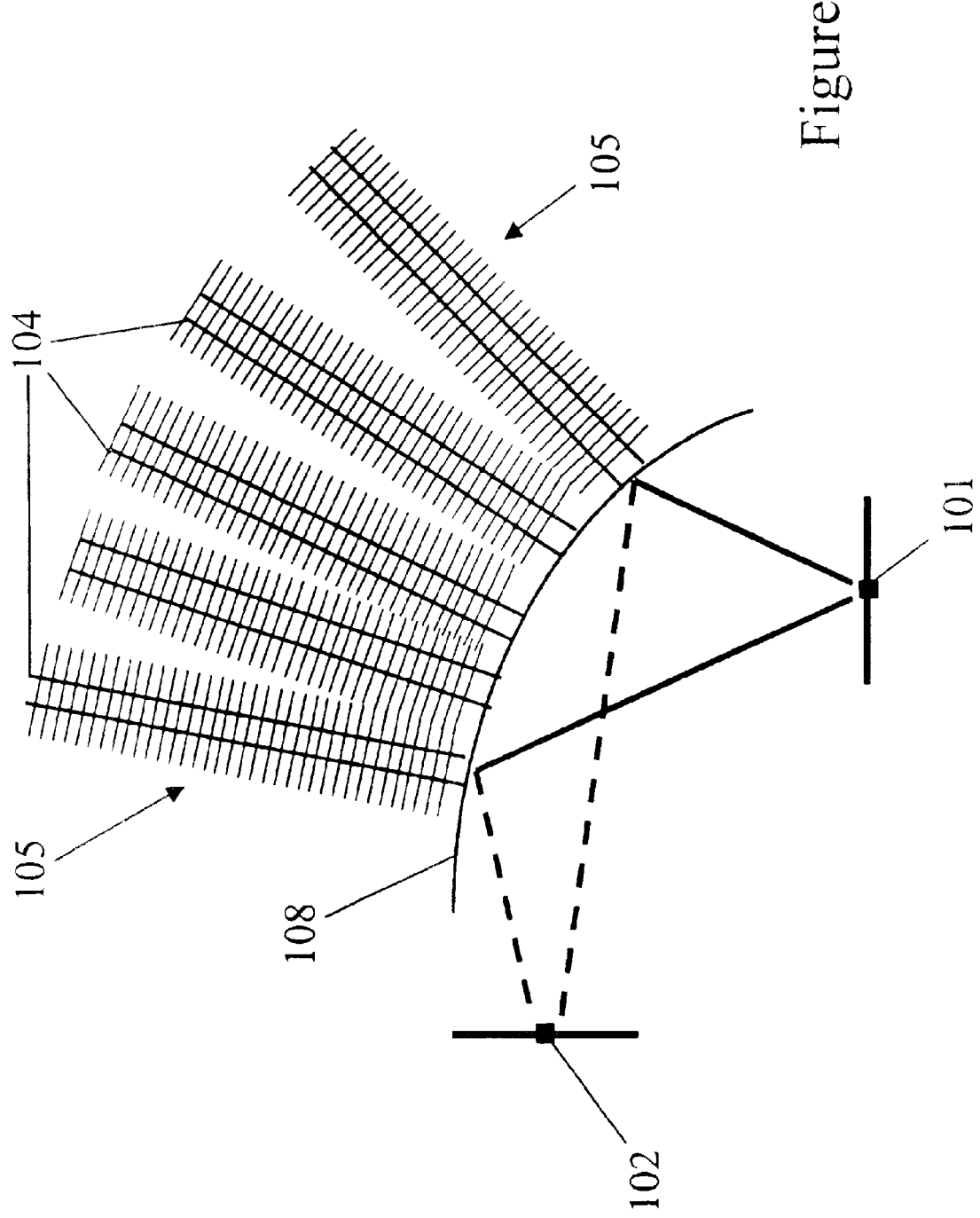

In another exemplary embodiment, illustrated schematically in FIG. 1B, the virtual contour 108 along which the first ends of the channel waveguides 104 are arranged is derived by interfering input and output optical beams in the optical element. At operating wavelength of interest, a first numerically-simulated optical field having spatial and spectral properties of the desired input optical beam is interfered (computationally) with a second numerically-simulated field that exhibits the spatial and spectral properties of the desired output optical beam. Optical fields from actual light sources may also be used for generating an interferogram. Numerically simulated generating fields may be employed that may not be readily obtainable from an actual light sources or in waveguide geometries of interest. First, the interference pattern between the two optical fields is calculated. For the specific case of two interfering fields the interference pattern consists of three contributions: i) a portion varying spatially in proportion to the intensity of the first field; ii) a portion varying spatially in proportion to the intensity of the second field; and iii) a portion that depends on the phase difference between the two fields, and which typically varies spatially on a relatively rapid scale (wavelength-scale). This third portion is referred to as an interferogram. Only the interferogram is employed for determining the shape of virtual contour 108. The amplitude of the interferogram itself, at any given spatial position, is proportional to a product of the optical field amplitudes of the interfering beams at that position and a trigonometric function (such as a cosine) of the phase difference between the interfering fields at that position. The latter phase-difference-dependent factor shall be referred to as the interferogram phase function, while the product of the optical field amplitudes shall be referred to as the interferogram amplitude function. The amplitude function of the interferogram is set to a constant. The calculated interferogram phase function may be digitized using points corresponding to maxima or minima (or other level contour if period doubling is avoided). If maxima are used, the resulting computed structure comprises a set of lines or curves on which the phase difference between the two interfering beams is an integer multiple of $2\pi$. At some desired distance away from the input port one of the aforementioned lines or curves is chosen as contour 108, along which the first ends of channel waveguides 104 are arranged. FIG. 1B shows a specific embodiment in which virtual contour 108 was derived by interfering input and output beams crossing at about a 90° angle. As noted above, virtual contour 108 is merely a convenient reference from which to measure relative phase shifts, and may be regarded as somewhat arbitrary.

Channel waveguides 104 are aligned so that each waveguide axis at its first end is substantially parallel to the bisector of the local wavevectors of the input and output optical fields at the center of the first end of the channel waveguide. The mode width of the channel waveguides at their first ends determines the divergence of an optical beam emerging from it. The mode widths may be chosen such that the desired locations of the input and output optical ports are substantially within this divergence angle, and the channel waveguide axial alignments deviate from the bisector provided this condition is substantially satisfied. The channel waveguide cores may be flared or tapered at the first ends thereof to achieve the desired beam divergence. It should be noted that an interferometrically derived virtual contour 108 may enable efficient optical coupling between pairs of corresponding input and output ports even at relatively large angles (outside the paraxial approximation), for spatially extended input and output ports (not point sources), as well as imaging of input-output port pairs having different beam waists and/or wavefronts. Note further, that, while most embodiments in the present disclosure depict devices wherein a focused input beam is routed to a focused output beam, it is also possible, using the present invention, to design devices with input and output beams of differing wavefront properties, e.g., converging, collimated, or diverging output beams routed from converging, collimated, or diverging input beams. All such combinations may be implemented in any of the exemplary embodiments disclosed herein, and shall within the present disclosure and/or appended claims.

Another exemplary embodiment according to the present disclosure is shown schematically in FIG. 2. An optical signal enters at optical port 201, from which diverging optical beam 211 propagates through slab waveguide region 203. In this exemplary embodiment channel waveguides 204, have flared (equivalently, tapered) ends to facilitate improved input beam coupling efficiency and emitted optical signal divergence angle, and are spatially offset from each other so as to be consistent with the resolution of the lithographic, stamping/embossing, or other process employed for fabrication. The end faces of the channel waveguides may be curved for improved input beam coupling efficiency, if appropriate. The distributed optical structure is divided into diffractive element subsets 205 corresponding to channel waveguides 204. The diffractive elements may substantially span the lateral extent of the propagating modes supported by the channel waveguides in this example. The diffractive elements 206 in this example are linear segments substantially perpendicular to the corresponding waveguide axis (other suitable arrangements, shapes, and/or orientations of the diffractive elements may be employed). In addition, geometries where diffractive elements are of smaller lateral extent than the mode field, including situations where the diffractive elements extend only over the channel waveguide core or a portion thereof, or over any sub-portion of the channel waveguide transverse modal profile, shall fall within the scope of the present disclosure and/or appended claims. The ends of the waveguides 204 are arranged on virtual contour 208, a circular arc centered at 207 in this example. Other shapes, positions, and/or arrangements of virtual contour 208 may provide improved input/output optical coupling and shall fall within the scope of the present disclosure and/or appended claims.

At any given position in a device output plane 209, the total output field comprises a coherent sum of all the optical fields back-diffracted from diffractive element subsets 205 and emerging from channel waveguides-204. Stated otherwise, the arrangement of channel waveguide ends on contour 208 may be regarded as forming a generalized optical structure wherein an input optical signal is divided among multiple device apertures (i.e., channel waveguide ends), and the amplitude, phase, and spectral bandpass of each device aperture (i.e., each channel waveguide output) is determined by the channel waveguides 204 and the corresponding diffractive element subsets 205 thereof. Since the diffractive element subsets 205 may be completely independent of one another, powerful phase and amplitude manipulation of the back-diffracted field at the device output port may be achieved (for example, by employing methods to control the amplitude and phase of the diffractive elements, as disclosed in the references cited hereinabove, for tailoring of the back-diffracted portions of the optical signal). Manipulating the phase, amplitude, and spectral bandpass of the channel waveguide output fields also enables general control of shape, position, and temporal/spectral characteristics of the device output at port 202 in the device output plane 209. General control over the relative phases of the back-diffracted portion of the optical signal provided general control over the wavefront and propagation direction of the total back-diffracted optical field emerging from the channel waveguides. Methods of varying complexity for accomplishing control of the phase, amplitude, and/or spectral bandpass of the channel waveguide output signals are described further hereinbelow.

In a first example, shown in FIG. 2, it may be assumed that all diffractive elements subsets 205 are located equal distances from the ends of the corresponding channel waveguides, i.e., from virtual contour 208. Consequently, relative phase shifts imparted by the channel waveguides 204 on the back-diffracted portions of the optical signal arise only from differences in optical path length between optical port 201 and the ends of the channel waveguides. In this case, the location of device output port 202 corresponds to a zeroth order of the set of device apertures defined by the ends of the channel waveguides. The relative spatial arrangement of optical ports 201 and 202 is determined by the imaging properties of virtual contour 208. In the illustrated example, where contour 208 is a circular arc centered at 207, ports 201 and 202 are located at output plane 209 substantially symmetrically positioned about center-of-curvature 207. Note that, when the angular spacing of the ends of channel waveguide 204 (as measured from center of curvature 207) is substantially uniform, higher-order outputs may appear at output plane 209. These may be used conveniently as additional device optical ports, or, if deemed undesirable, higher-order outputs may be suppressed, by non-uniform angular spacing of the ends of channel waveguides 204, by increasing the width of the ends of the channel waveguides by flaring or tapering, for example) so that higher-order outputs lie outside the divergence angles of the channel waveguides, or by other suitable means.

Figure 3:
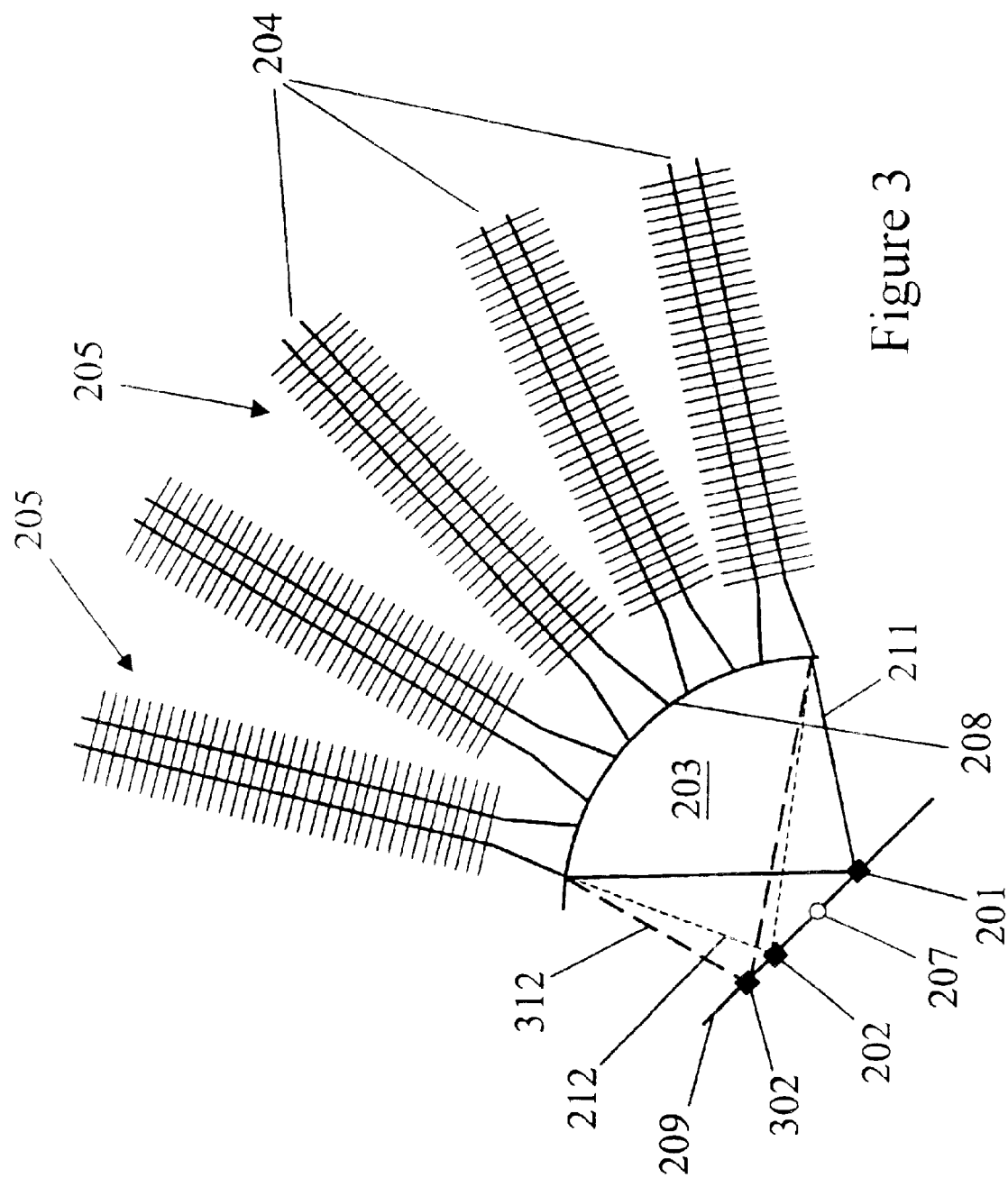
FIG. 3 is a schematic top view of an optical device with diffractive elements and channel waveguides.

FIG. 3 schematically illustrates another exemplary embodiment. Unless otherwise stated, the device of FIG. 3 resembles the device of FIG. 2 (with analogous numbering of elements). The substantive difference between the devices of FIGS. 2 and 3 is that the corresponding diffractive element subsets 205 of channel waveguides 204 are not located at equal distances from the ends of the channel waveguides (i.e., from virtual contour 208). As in the embodiment of FIG. 2, an entering optical signal propagates through slab waveguide region 203 and is divided among channel waveguides 204. Portions of the optical signal are back-diffracted from corresponding diffractive element subsets 205 if resonant therewith. The net optical path length traveled by back-diffracted light within the channel waveguides is twice the separation between waveguide end and an effective point of reference of the diffractive element subset (multiplied by the appropriate modal index). The differing optical paths among the diffractive element subsets 205 impart additional relative phase shifts among the back-diffracted portions of the optical signal, in addition to that due to differing propagation lengths in the slab waveguide region. Such phase differences result in shifting of the relative spatial arrangement of the optical ports, e.g., spatially altered and/or shifted output beam 312 (altered and/or shifted relative to the original output beam 212), and/or a spatially altered and/or shifted device output port 302 (from the original output port 202 with no phase differences imparted by the channel waveguides or diffractive element subsets).

The particular set of phase shifts imparted into the back-diffracted portions of the optical signal determine (at least in part) the spatial alteration and/or shift (i.e., the relative spatial arrangement) of the optical ports. For example, if the imparted phase shifts vary linearly across the set of channel waveguides, then the shifted optical beam and corresponding optical port will substantially retain its shape and be shifted to a different location. A set of phase shifts may be imparted that leave the optical port in its original location but alter its shape (i.e., alter the transverse spatial profile of the back-diffracted optical signal). Any set of relative phase shifts may be employed to yield a desired spatial alteration and/or shift of an optical port, and shall fall within the scope of the present disclosure and/or appended claims. If the diffractive element subsets are positioned along the channel waveguides so that the net (i.e., round trip or double pass for back-diffracted optical signals) relative phase shifts differ by less than $2\pi$, then the optical output may be referred to as zeroth-order. Optical output resulting from relative phase shifts differing by more than $2\pi$ may be referred to as higher-order (1st, 2nd, ...) as appropriate. Higher-order optical output may typically exhibit a greater degree of chromaticism than zeroth-order optical output, which may be desirable or undesirable depending on the particular use of the optical device.

It should be noted that while these descriptions refer to fixed input port and a spatially altered and/or shifted output port, they may equally well describe a fixed output port and a spatially altered and/or shifted input port, or spatially altered and/or shifted input and output ports. In general, the relative spatial arrangement of the ends of the channel waveguides and any relative phase shifts imparted in the channel waveguides define a relative spatial arrangement of pairs of optical ports.

Rather than physically shifting the positions of the diffractive element subsets 205 at different locations with respect to virtual contour 208, relative phase shifts among the back-diffracted portions of the optical signal may also be introduced by other means, and may be employed for yielding permanent or temporary relative phase shifts among the back-diffracted portions of the optical signal. The ends of channel waveguide 204 may be spatially shifted relative to one another, for example, and may not necessarily correspond to contour 208 (or any other readily-defined contour). Static phase shifters may be incorporated into the channel waveguides in various ways, for example taking the form of waveguide segments having a differing modal index and various lengths. Such waveguide segments may be formed in any suitable way, including but not limited to variations in channel waveguide structure (core and/or cladding), use of varying waveguide materials (core and/or cladding), modification of waveguide materials (core and/or cladding, by densification, irradiation, etc), and so forth. Temporary phase shifts may be imparted using phase modulators of any suitable type, including but not limited to electro-optic modulators, photoelastic modulators, non-linear optical modulators, and so on, and impart relative phase shifts in response to applied control signals. Such phase shifters or modulators may be positioned so as to interact with optical signals propagating in the corresponding channel waveguides at contour 208 or between contour 208 and corresponding diffractive element subsets 205. Imparting reversible relative phase shifts enables switching of device output port 302 among differing locations (or equivalently, switching a device input port among differing locations). This may be useful, for example, for switching between different input and/or output optical waveguides.

Figure 4:
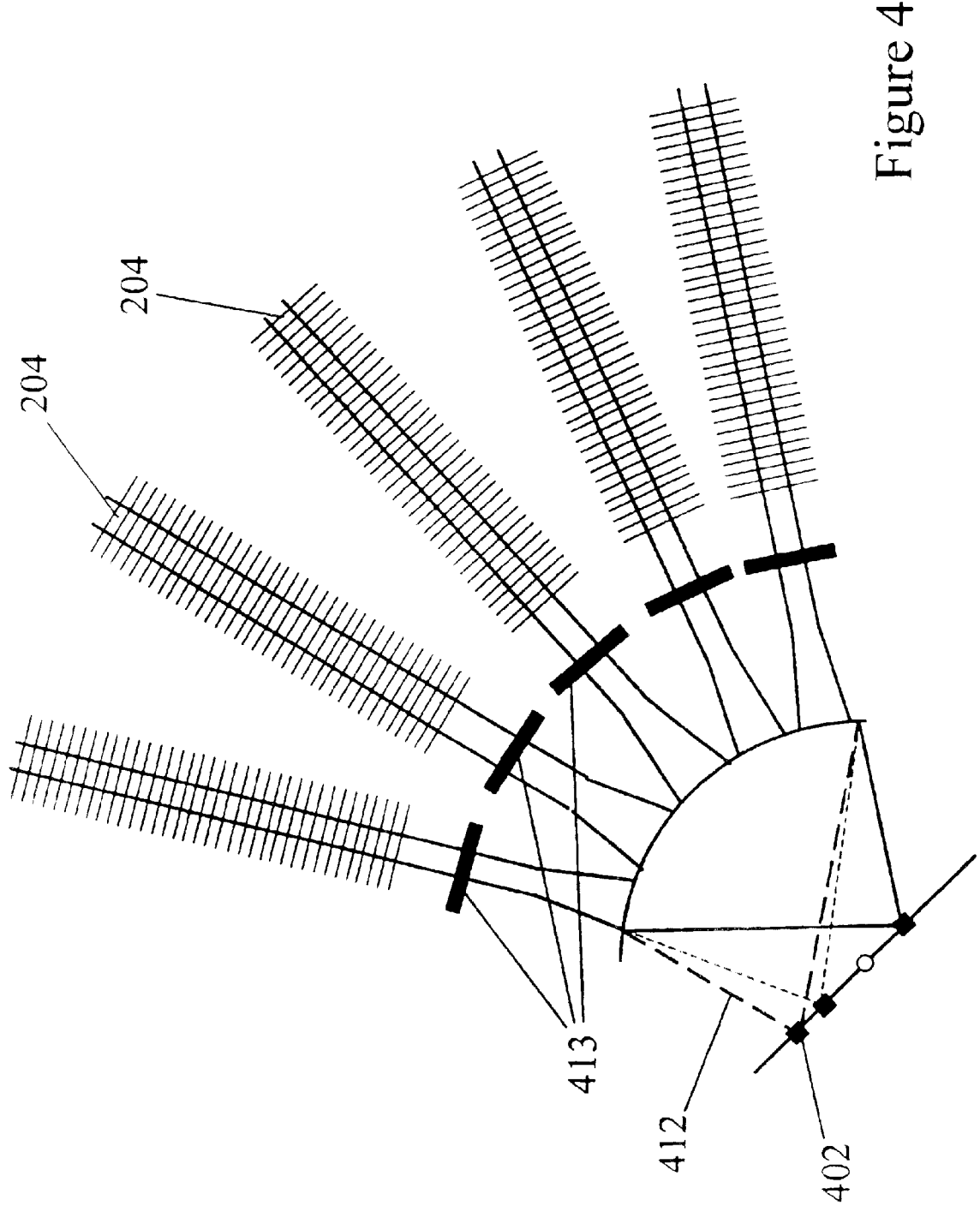
FIG. 4 is a schematic top view of an optical device with diffractive elements and channel waveguides.
Figure 5:
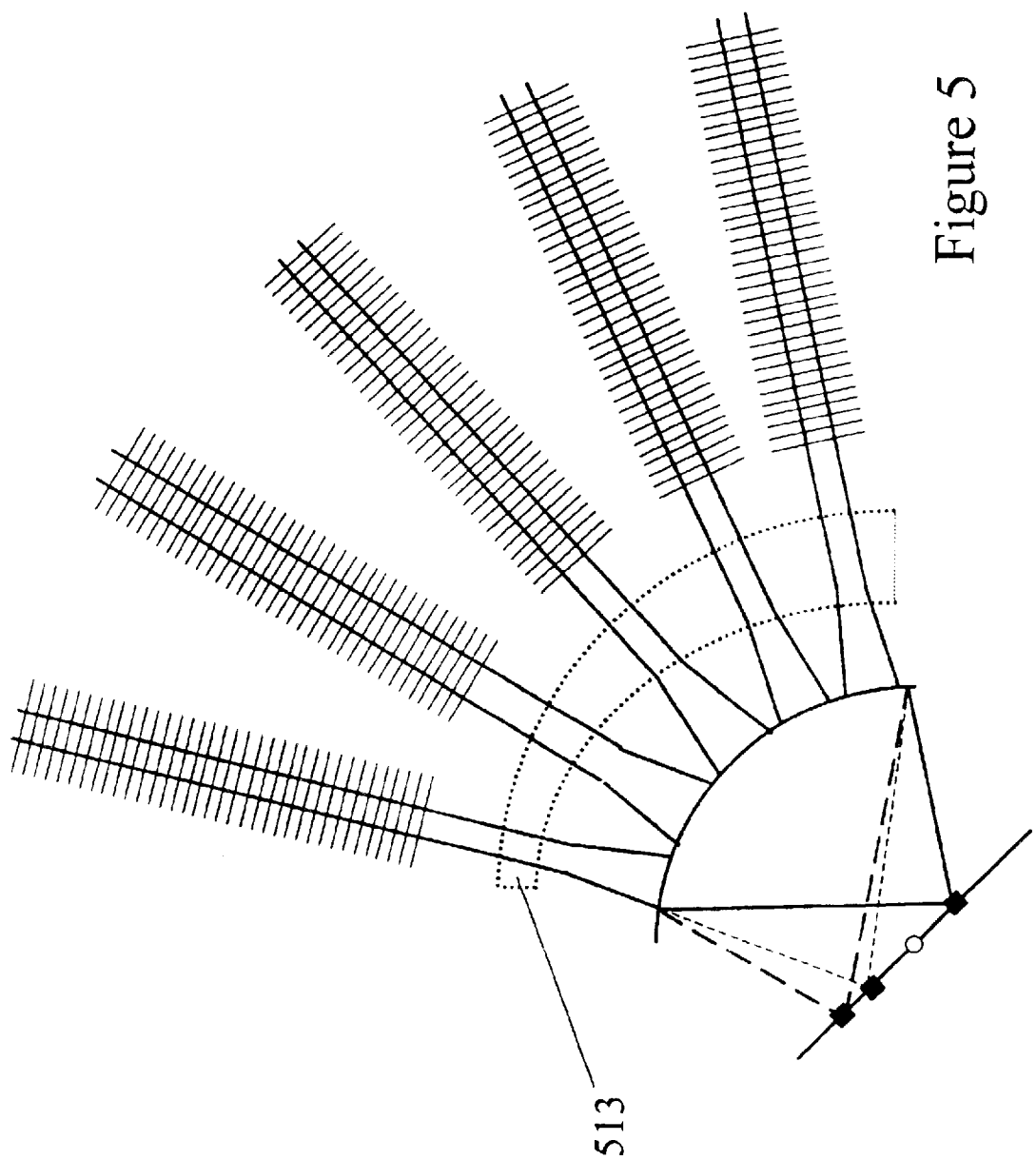
FIG. 5 is a schematic top view of an optical device with diffractive elements and channel waveguides.

FIG. 4 illustrates schematically an exemplary embodiment in which individual phase shifters or modulators 413 are positioned at each channel waveguide 204. All phase shifters/modulators 413 are shown as having the same physical length therethrough. To impart the desired relative phase shifts and spatially shift the output beam 412 and output optical port 402, static phase shifters would exhibit differing modal indices, while phase modulators would require differing control signal levels applied to each modulator. In the exemplary embodiment illustrated schematically in FIG. 5, phase shifters/modulators 513 are shown as having differing physical lengths therethrough. Imparted relative phase shifts may arise from the differing path lengths, so that a single modal index may be employed in static phase shifters, or a single control signal level may be applied to phase modulators. While phase/shifters/modulators 513 are shown in FIG. 5 as a single contiguous element spanning the channel waveguides, they could equivalently comprise corresponding distinct elements for the channel waveguides. It should be noted that numerous variations and/or combinations of the methods illustrated in FIGS. 4 and 5, including schemes wherein the phase shifters/modulators are placed in the slab waveguide region, shall fall within the scope of the present disclosure and/or appended claims.

Figure 6:
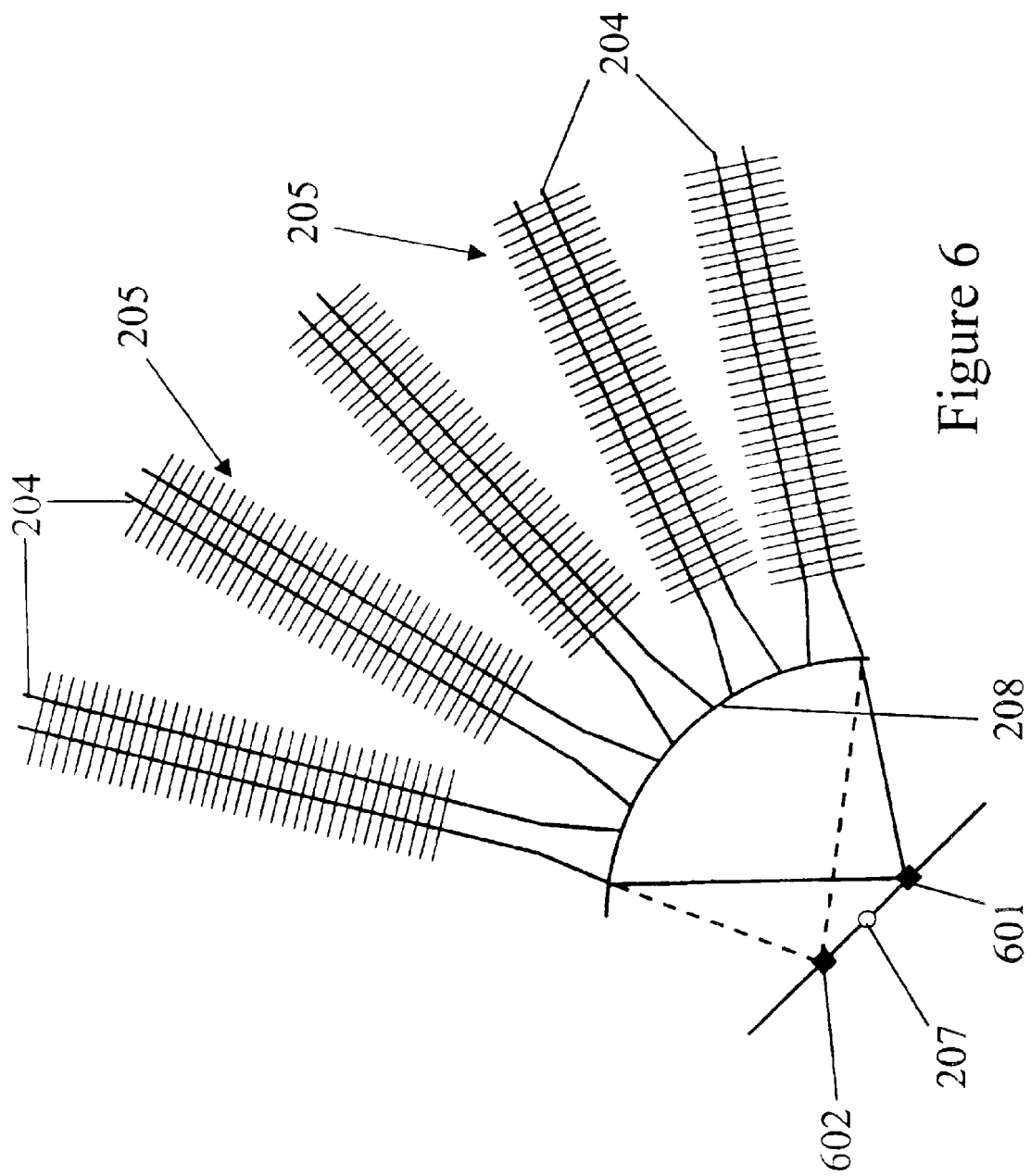
FIG. 6 is a schematic top view of an optical device with diffractive elements and channel waveguides.

In the exemplary embodiment schematically illustrated in FIG. 6, diffractive element subsets 205 are positioned along the corresponding channel waveguides 204 so that the relative phase shifts (round trip, or double pass phase shifts for back-diffracted optical signals) for adjacent channel waveguides increases by $2\pi m$, where m is an integer (not zero). In this case, the device input and output ports 601 and 602, respectively, are located substantially symmetrically about center-of-curvature 207 of virtual contour 208. This relative positioning of input and output ports corresponds to the $m^{th}$ order output of the set of device apertures defined by the ends of the channel waveguides. The spectral bandpass of the portion of the optical signal routed to this point is given by the smaller of the spectral bandpass of the corresponding diffractive element subsets 205 and $\Delta\lambda=\lambda/Nm$, where $\lambda$ is a resonant wavelength of the diffractive element set and N is the total number of channel waveguides. By altering the relative phase shifts among the back-diffracted portions of the optical signal, as described for FIGS. 3 through 5, the relative spatial arrangement of optical ports 601 and 602 may be modified.

Figure 7:
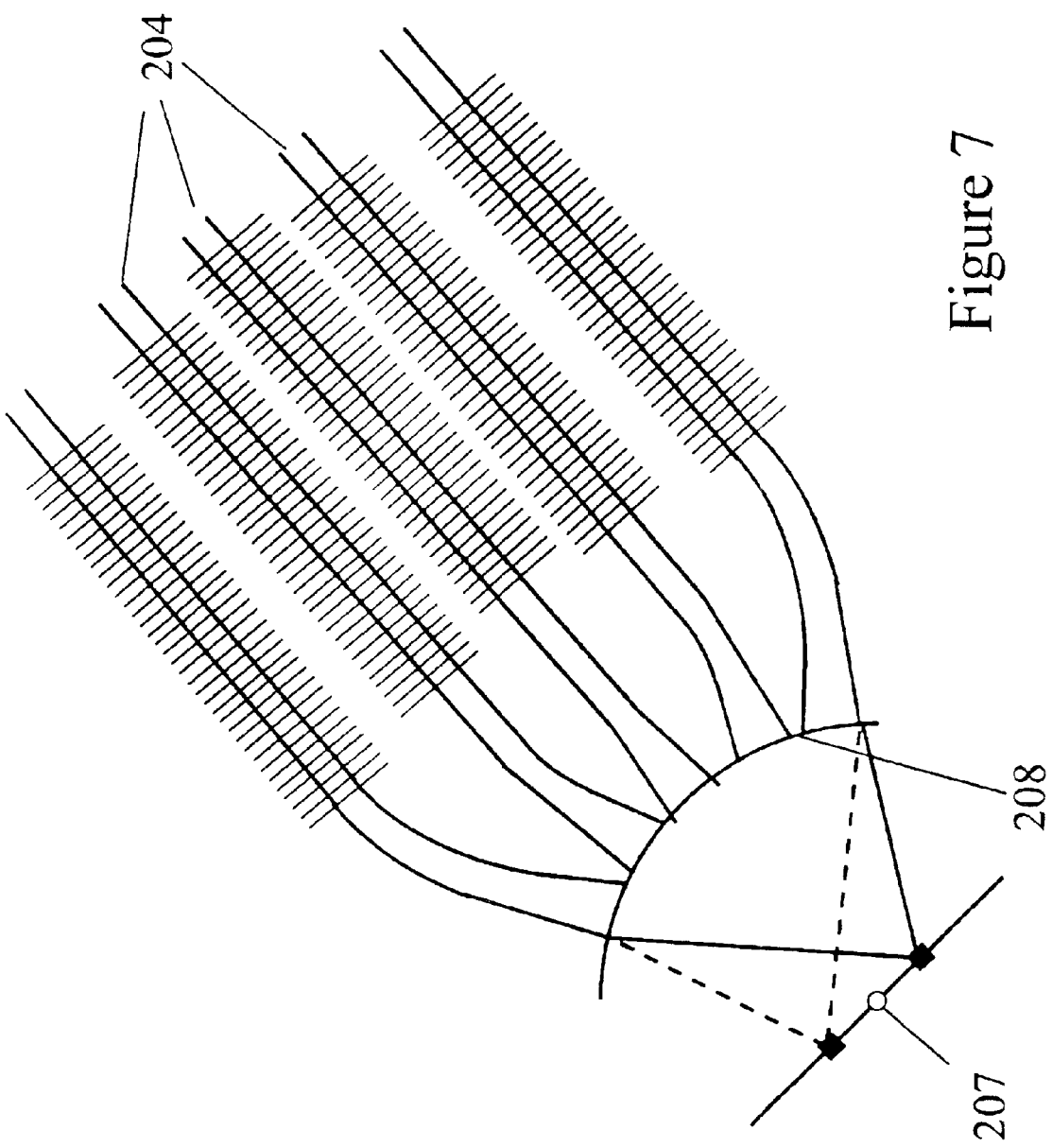
FIG. 7 is a schematic top view of an optical device with diffractive elements and channel waveguides.

Once the optical signal has been divided among the channel waveguides 204, only the relative optical paths traversed by the optical signal are relevant to the function of the optical device. In the exemplary embodiment schematically illustrated in FIG. 7, the channel waveguides 204 are oriented radially at virtual contour 208 (as in the previous Figures), but then curve so as to become substantially parallel to one another (in this example). This arrangement may enable reduction of overall device size, while functioning in a manner analogous to any of the previous exemplary embodiments.

Figure 8:
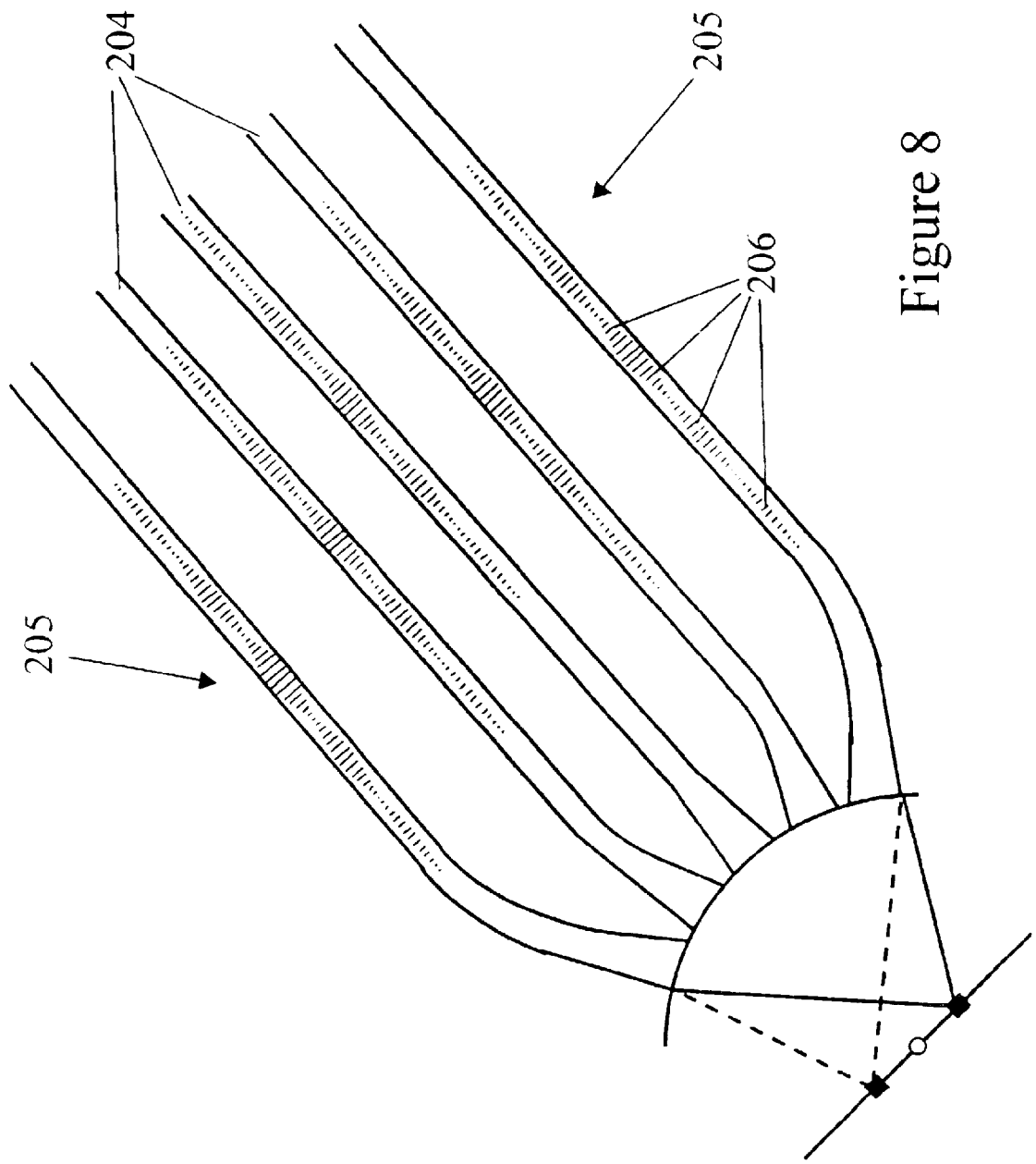
FIG. 8 is a schematic top view of an optical device with diffractive elements and channel waveguides.

In the exemplary embodiment schematically illustrated in FIG. 8, diffractive element subsets 205 are modified according to the teachings of various of the references cited hereinabove for controlling the amplitude and phase of portions of the optical signal back-diffracted by diffractive element subsets (i.e., for apodization). In this particular example the transverse extent of individual diffractive elements 206 are modulated as a function of position along the corresponding channel waveguide 204, and may also exhibit position-dependent longitudinal offsets (relative to nominally uniform element spacing) to yield desired back-diffracted optical field phase shifts for overall customization of a spectral transfer function of the diffractive element subset. Many other types of modifications and/or adaptations may be employed for amplitude and/or phase manipulation of the back-diffracted optical signal are disclosed in the cited references, and shall fall within the scope of the present disclosure and/or appended claims. Such customization (i.e., apodization) may be common to all channel waveguides or may differ among the channel waveguides to achieve a desired overall spectral-spatial transfer function for the device. Various modifications disclosed for other exemplary embodiments may be combined with those illustrated in FIG. 8 in any suitable way.

Figure 9:
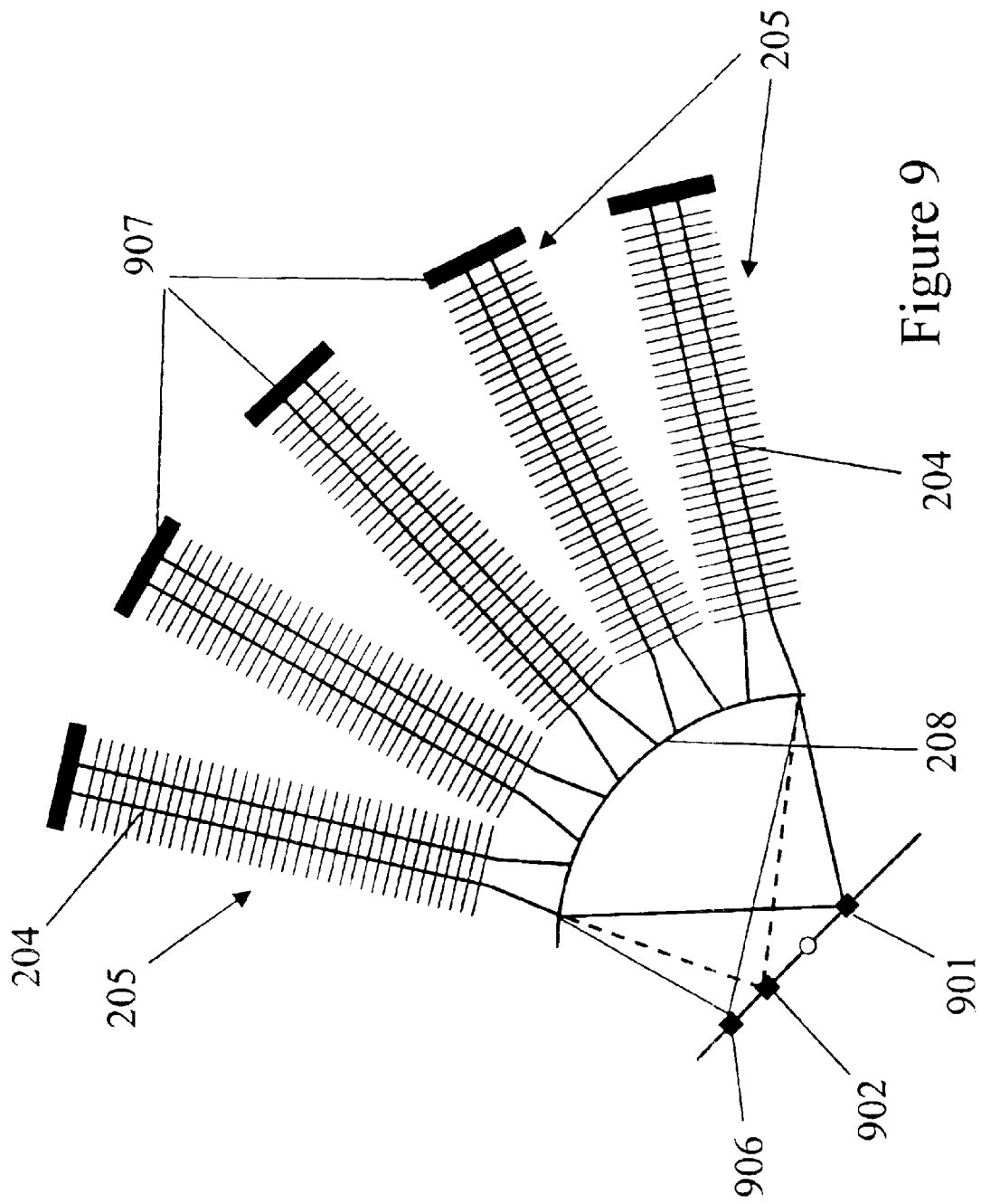
FIG. 9 is a schematic top view of an optical device with diffractive elements and channel waveguides.

In the exemplary embodiment schematically illustrated in FIG. 9, the channel waveguides 204 include corresponding broadband reflectors 907. As in previous exemplary embodiments, an entering optical signal is divided among the channel waveguides 204, and portions are back-diffracted by diffractive element subsets 205 and routed to an output port (906 in this example, the location of which may be determined in any manner disclosed herein). Portions of the optical signal transmitted by the diffractive element subsets 205 are redirected by broadband reflectors 907, emitted from the ends of channel waveguides 204, and exit the planar waveguide at optical port 902. The broad band reflectors 907 may be formed in any suitable manner, including but not limited to thin-film dielectric mirrors (butted against a second end of the channel waveguides or directly coated onto them), metal mirrors or coatings (such as gold), a diffraction grating in Littrow arrangement, a broadband distributed reflector, and so forth. These and other suitable broadband reflectors shall fall within the scope of the present disclosure and/or appended claims. In this example, the channel waveguides have the same optical path between virtual contour 208 and the broadband reflectors 907, so that optical port 902 receives zeroth order output of the broadband redirected portions of the optical signal from the channel waveguides. Many other arrangements may be implemented for determining the relative spatial arrangement of ports 901 and 902, including any of the schemes described above for the back-diffracted portions of the optical signal. Relative phase shifts may be imparted on the redirected portions of the optical signal by differing positions of the broadband reflectors along the corresponding channel waveguides, phase shifters, and/or phase modulators. Phase modulators may be employed for shifting the relative spatial arrangement of corresponding pairs of optical ports in response to applied control signal(s).

The exemplary embodiment of FIG. 9 may function as an optical multiplexer or demultiplexer. To function as a channel-dropping demultiplexer, optical port 901 comprises an input port, optical port 902 comprises an output port, and optical port 906 comprises a dropped-channel port. To function as a channel-adding multiplexer, optical port 902 comprises an input port, optical port 901 comprises an output port, and optical port 906 comprises an added-channel port. It should be noted that for any of the exemplary embodiments disclosed herein, input ports and output ports may generally be interchanged. A diffractive element set, set of reflectors, or other optical structure that routes an optical signal or portion thereof between a pair of optical ports can generally do so in either direction. Therefore, labeling of ports as input or output may be somewhat arbitrary, or may depend on the manner of use of the optical apparatus.

Figure 10A:
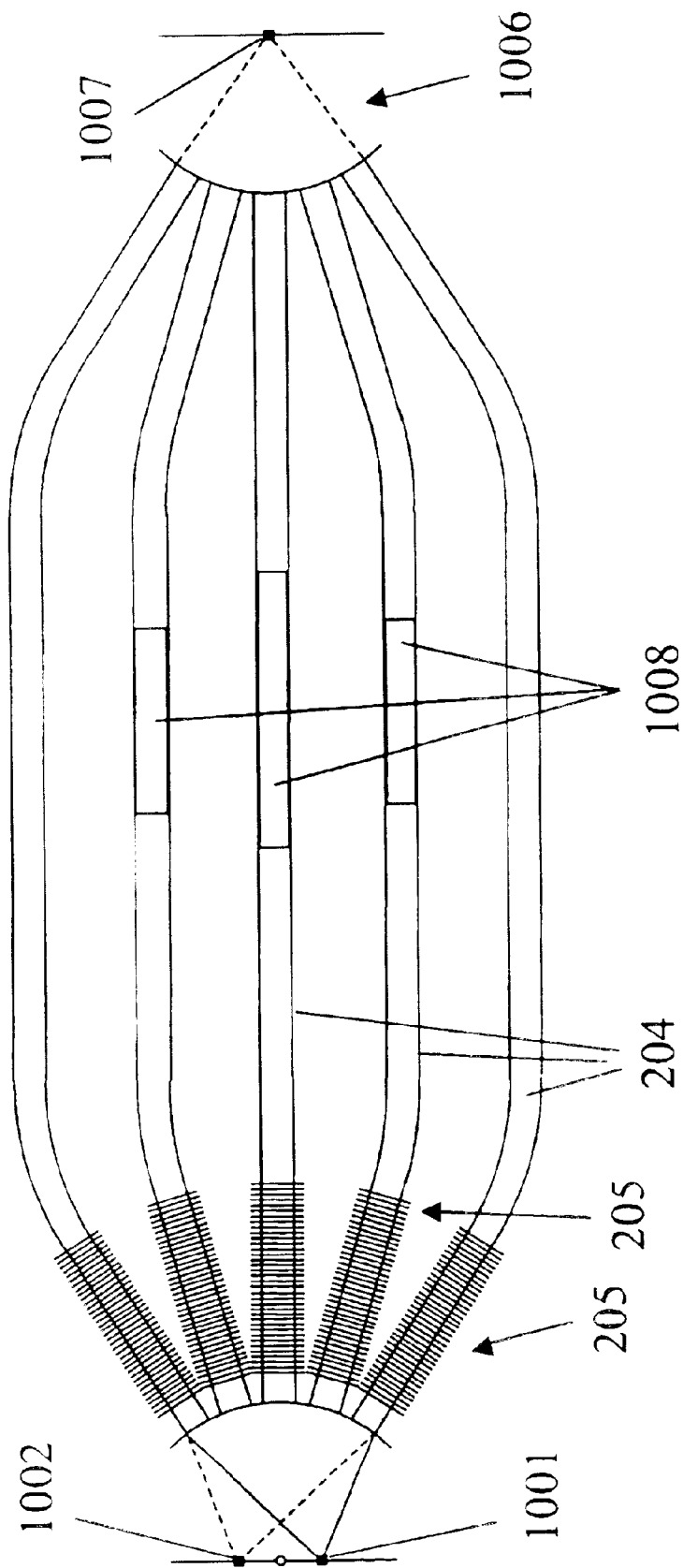
FIGS. 10A and 10B are schematic top views of an optical device with diffractive elements and channel waveguides.
Figure 10B:
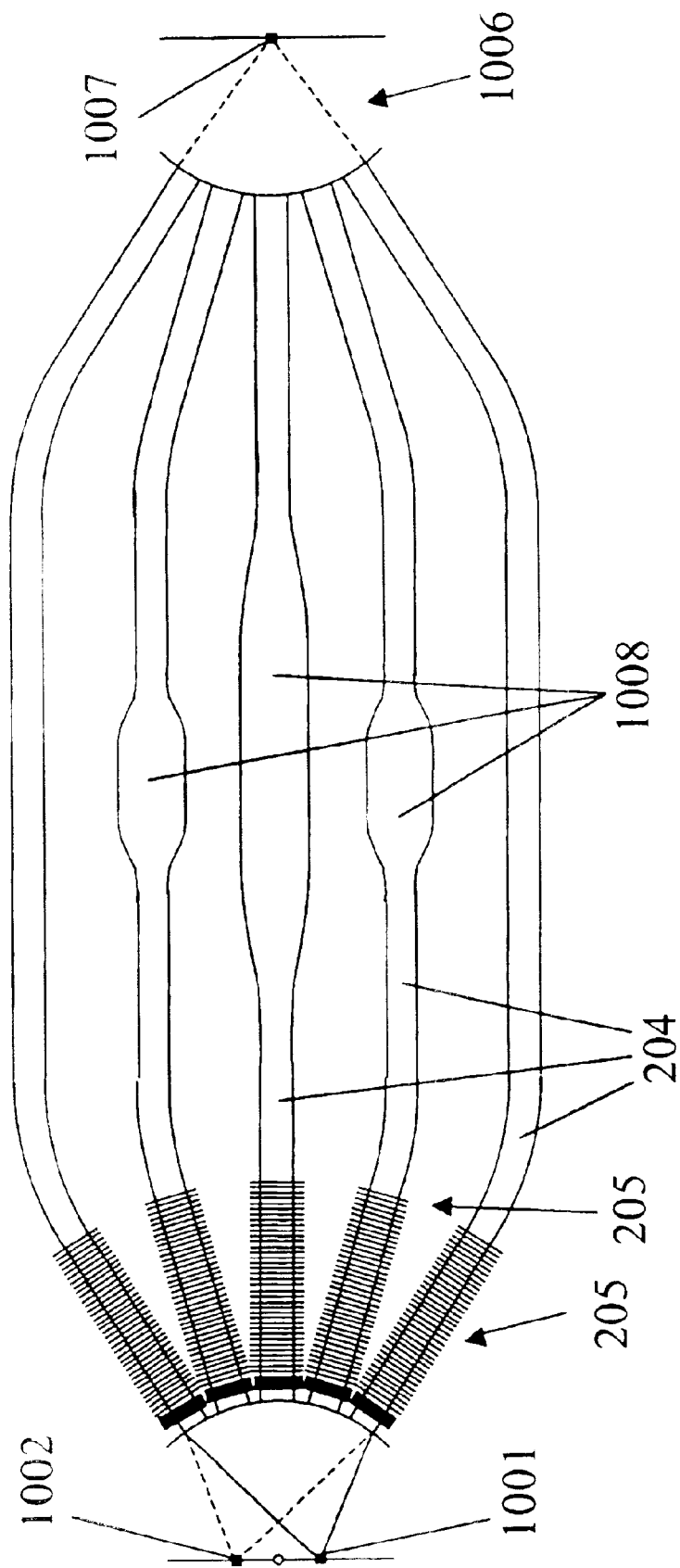
Figure 11:
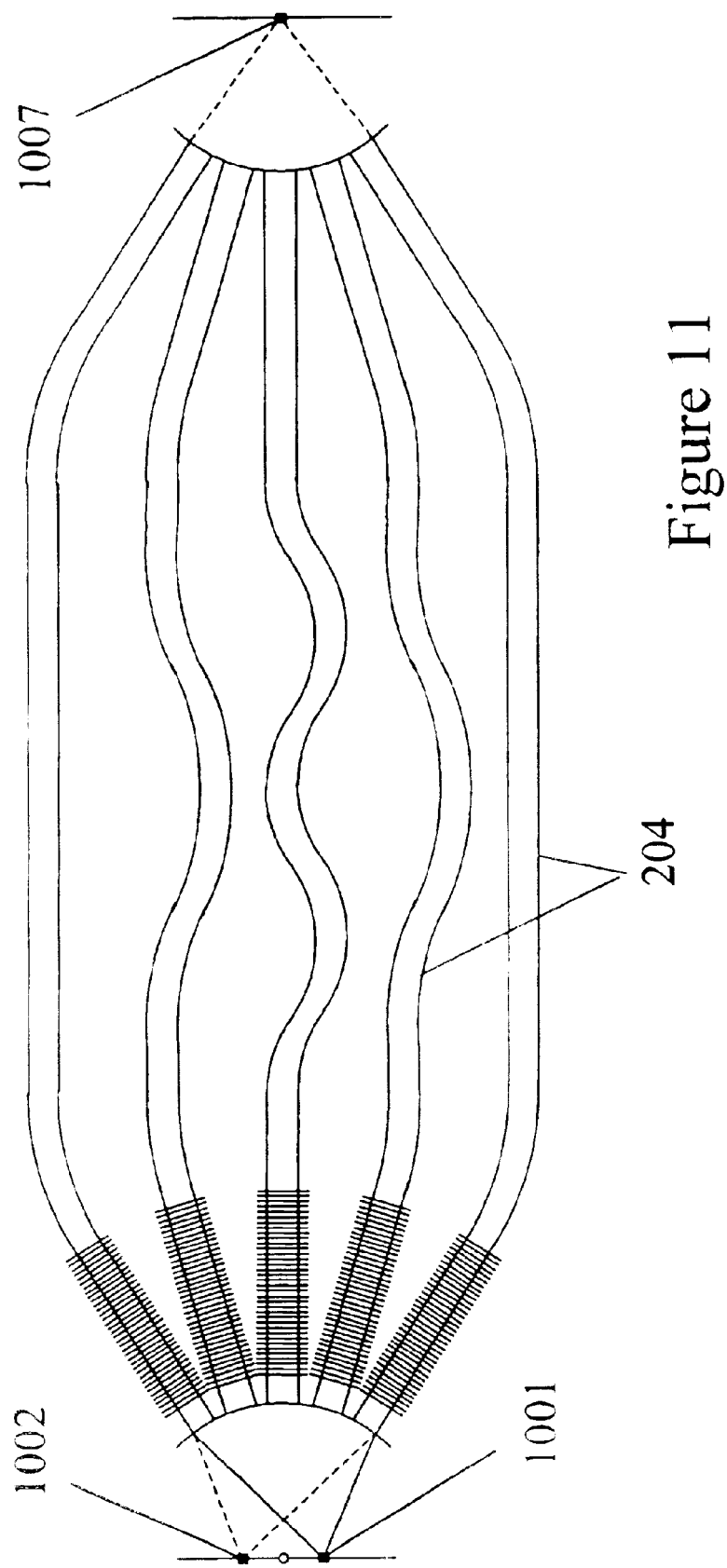
FIG. 11 is a schematic top view of an optical device with diffractive elements and channel waveguides.
Figure 12:
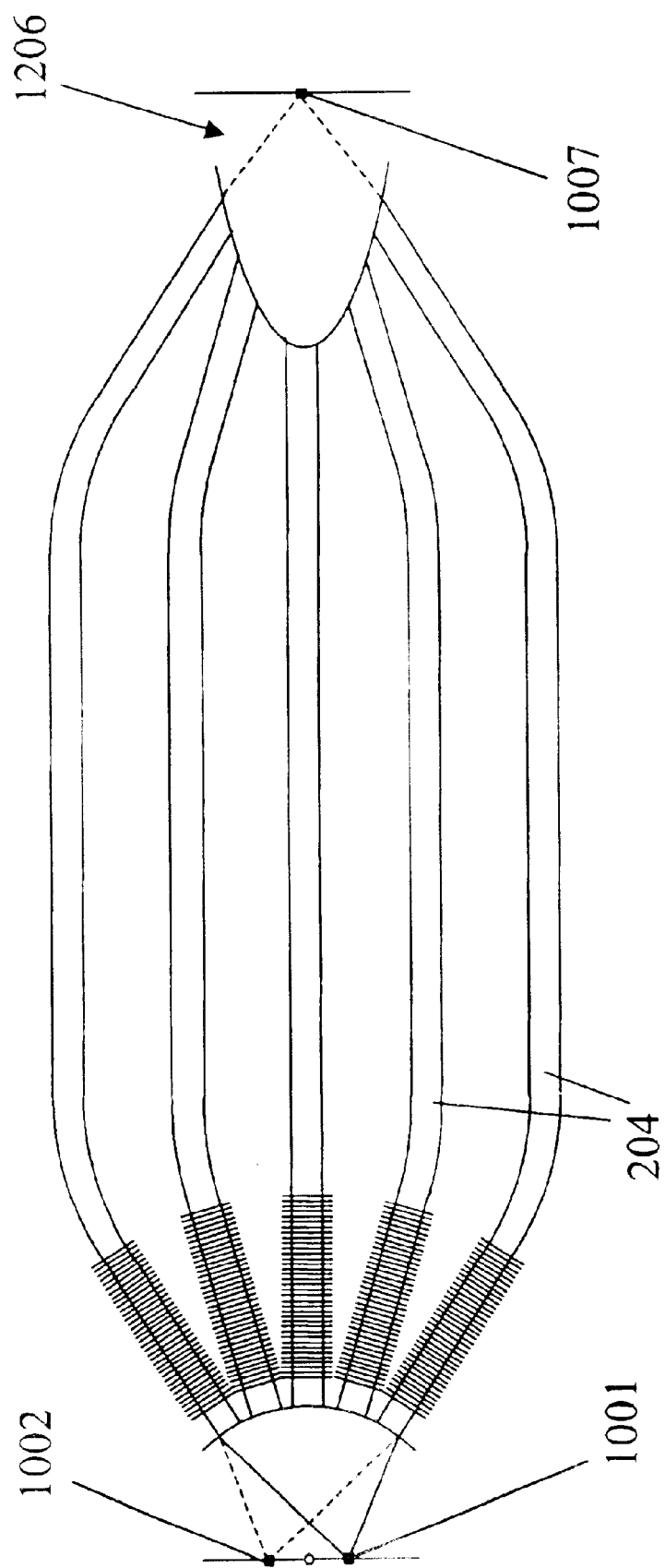
FIG. 12 is a schematic top view of an optical device with diffractive elements and channel waveguides.

In the exemplary embodiment schematically illustrated in FIGS. 10A and 10B, back-diffracted portions of the optical signal are routed between optical ports 1001 and 1002, while portions of the optical signal that are transmitted by the diffractive element subsets 205 propagate along channel waveguides 204 to their second ends. Upon being emitted from the second ends of the channel waveguides, the transmitted portions of the optical signal propagate through a second slab waveguide region 1006. The relative spatial arrangement of the first ends of the channel waveguides, the relative spatial arrangement of the second ends of the channel waveguides, and phase shifts imparted on the transmitted portions of the optical signal by the channel waveguides define the relative spatial arrangement of optical ports 1001 and 1007. Optical port 1007 may receive zeroth order transmitted optical signal or higher-order transmitted optical signal, depending on the relative imparted relative phase shifts. Relative phase shifts may be imparted on the transmitted portions of the optical signal by static phase shifters 1008, shown with differing lengths in FIGS. 10A and 10B (to compensate for the differing lengths of waveguides 204). In FIG. 10A, phase shifters 1008 comprise channel waveguide core segments having an increased refractive index, yielding a larger modal index. In FIG. 10B, phase shifters 1008 comprise channel waveguide core segments having an increased width, yielding a larger modal index. However, other various means may be employed for imparting desired relative phase shifts onto transmitted portions of the optical signal, analogous to those disclosed hereinabove for back-diffracted and/or redirected optical signals and employing differing path lengths, phase shifters, and/or phase modulators. For example, relative phase shifts may be imparted by the lengths of the channel optical waveguides. In the example of FIG. 11, the lengths of the channel waveguides are made substantially equal (i.e., zero relative phase shifts). In the example of FIG. 12, the relative spatial arrangement of the second ends of the channel optical waveguides about slab waveguide region 1206 compensates for non-zero relative phase shifts imparted by differing channel waveguide lengths, yielding zeroth order optical output at optical port 1007. This latter scheme relies on a modal index within the slab waveguide region that differs from the modal index of the channel waveguides to enable phase compensation. Various combinations of higher- or lower-index slab waveguide region (relative to the channel waveguide modal index) and corresponding relative spatial arrangement of the second ends of the channel waveguides shall fall within the scope of the present disclosure and/or appended claims.

Figure 13:
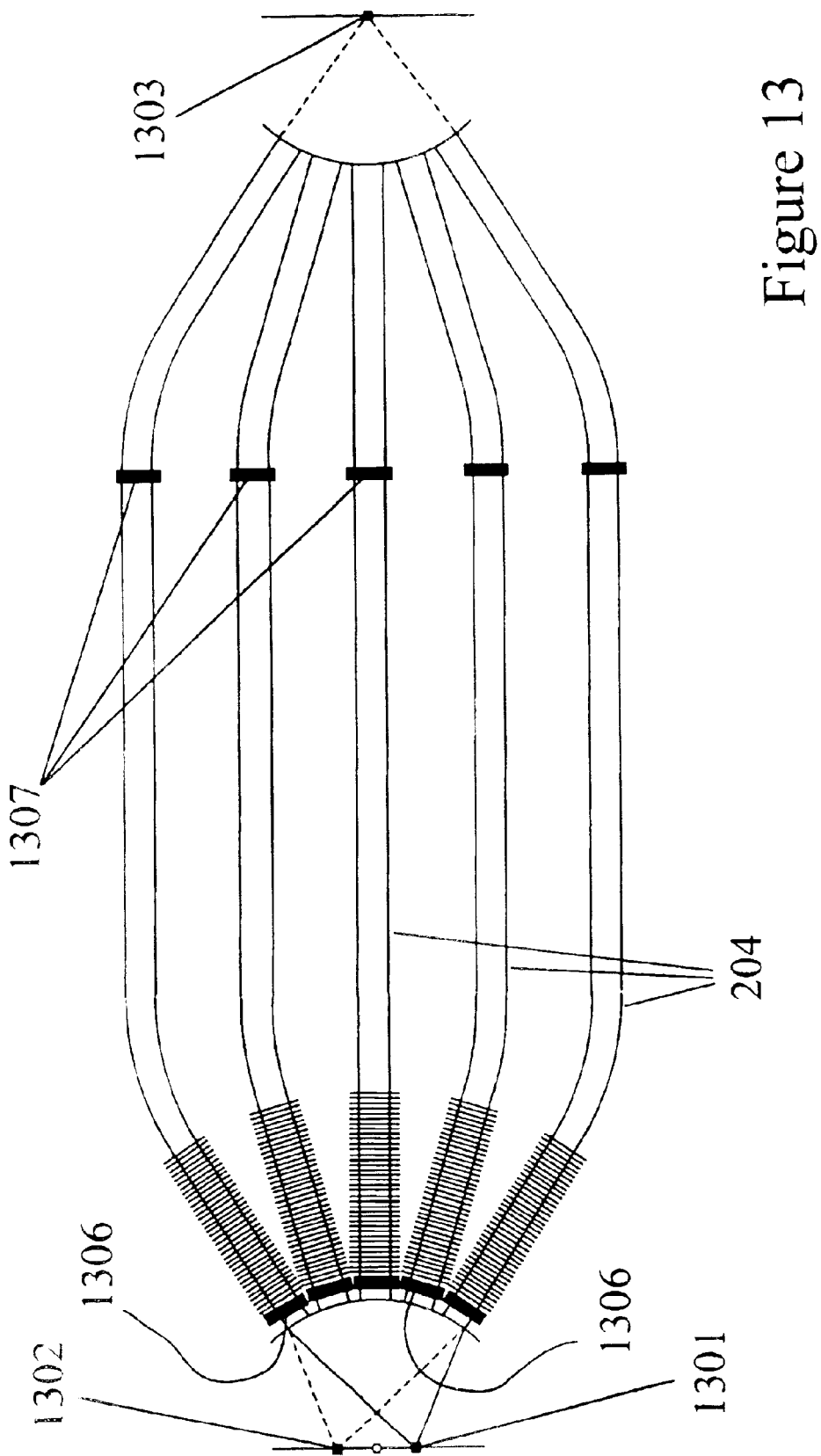
FIG. 13 is a schematic top view of an optical device with diffractive elements and channel waveguides.

In the exemplary embodiment schematically illustrated in FIG. 13, phase shifters/modulators 1306 are employed for defining the relative spatial arrangement of optical ports 1301 and 1302 (for the back-diffracted portions of the optical signal). Phase shifters/modulators 1307 are employed for defining the relative spatial arrangement of optical ports 1301 and 1303 (for the transmitted portions of the optical signal). Phase shifters/modulators 1307 may partly compensate for phase shifts imparted on transmitted portions of the optical signal by phase shifters/modulators 1306. Use of phase modulators enables controlled shifting of the relative spatial arrangements of optical ports 1301, 1302, and 1303.

Any of the exemplary embodiments of FIGS. 10, 11, 12, and 13 may function as an optical multiplexer or demultiplexer. To function as a channel-dropping demultiplexer, optical port 1001 or 1301 comprises an input port, optical port 1002 or 1302 comprises a dropped-channel port, and optical port 1007 or 1303 comprises an output port. To function as a channel-adding multiplexer, optical port 1002 or 1302 comprises an added-channel port, optical port 1001 or 1301 comprises an output port, and optical port 1007 or 1303 comprises an input port. As stated hereinabove, designation of an optical port as an input or output may vary with the particular use of a particular device. In any of the embodiments of FIGS. 10, 11, 12, or 13, the second ends of the channel waveguides may be structurally adapted for optical coupling with the corresponding optical port. Such adaptations may include flaring or tapering of the end of the waveguide, and/or curved waveguide end faces. Any of the exemplary embodiments of FIGS. 10, 11, 12, and 13 may be further modified to include additional diffractive element sets and one or more additional optical port(s) near optical port 1007 (or 1303 in FIG. 13). Such additional diffractive element sets may route back-diffracted portions of optical signals between optical port 1007 (or 1303 in FIG. 1303) and one of the additional ports. Additional optical functionality may be implemented by back-diffraction of optical signals entering the channel waveguides at either of the ends thereof.

Figure 14:
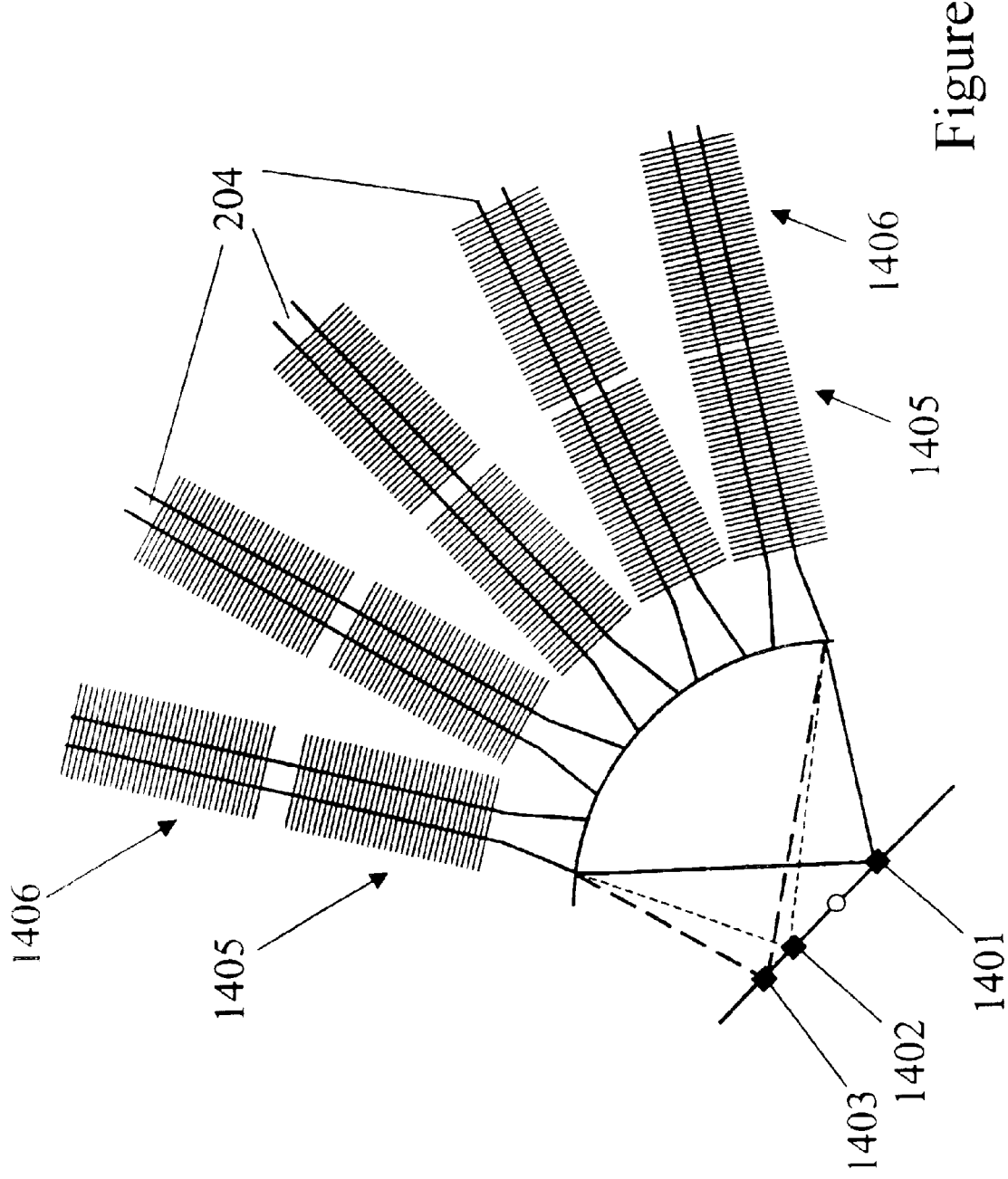
FIG. 14 is a schematic top view of an optical device with diffractive elements and channel waveguides.

In the exemplary embodiment illustrated schematically in FIG. 14, the optical element has two sets of diffractive elements. A first set of diffractive elements comprises diffractive element subsets 1405, while a second set of diffractive elements comprises diffractive element subsets 1406. The entering optical signal is divided among the waveguides 204, and first portions are back-diffracted from diffractive element subsets 1405 and thereby routed between optical ports 1401 and 1402. Second portions of the optical signal are back-diffracted from diffractive element subsets 1406 and thereby routed between optical ports 1401 and 1403. The distinct diffractive element sets typically impart differing spectral and/or temporal characteristics onto the corresponding back-diffracted portions of the optical signal. For each of the back-diffracted portions of the optical signal, all of the modifications, adaptations, and/or arrangements disclosed hereinabove may be employed. One or more additional diffractive element sets (comprising corresponding diffractive element subsets) may be present, and may back-diffract additional corresponding portions of the optical signal and thereby route them between corresponding pairs of optical ports. The channel waveguides may include broadband reflectors for redirecting the transmitted portions of the optical signal, or may emit the transmitted portions from their second ends. Such embodiments (including that of FIG. 14) may be function as optical multiplexers and/or demultiplexers. To function as a demultiplexer, optical port 1401 comprises an input port, optical port 1402 comprises a first channel output port, and optical port 1403 comprises a second channel output port. To function as a multiplexer, optical port 1402 comprises a first channel input port, optical port 1403 comprises a second channel input port, and optical port 1401 comprises an output port. Additional diffractive element sets (as described above) enable multiplexing/demultiplexing of additional channels. The embodiment of FIG. 14 employs diffractive elements subsets occupying distinct segments along the length of the channel waveguides (i.e., stacked diffractive element subsets). Analogous embodiments may be constructed in which the multiple diffractive element subsets are overlaid or interleaved on each channel waveguide. Alternatively, multiple distinct diffractive element sets may be interleaved among different channel optical waveguides. For example, each channel waveguide may include a diffractive element subset from only one of the diffractive element sets present in the optical element. In a further variation of the exemplary embodiment of FIG. 14, the diffractive element subsets 205 may be chirped or otherwise vary in their longitudinal spacings along channel waveguides 204, to achieve desired temporal and/or spectral characteristics. For example, if diffractive element subsets 205 are chirped at differing rates along the lengths of the corresponding channel waveguides 204, differing spectral portions of the back-diffracted optical signal will be directed to differing output port locations. These and other such modifications to the diffractive element subsets 205 shall fall within the scope of the present disclosure and/or appended claims.

Figure 15:
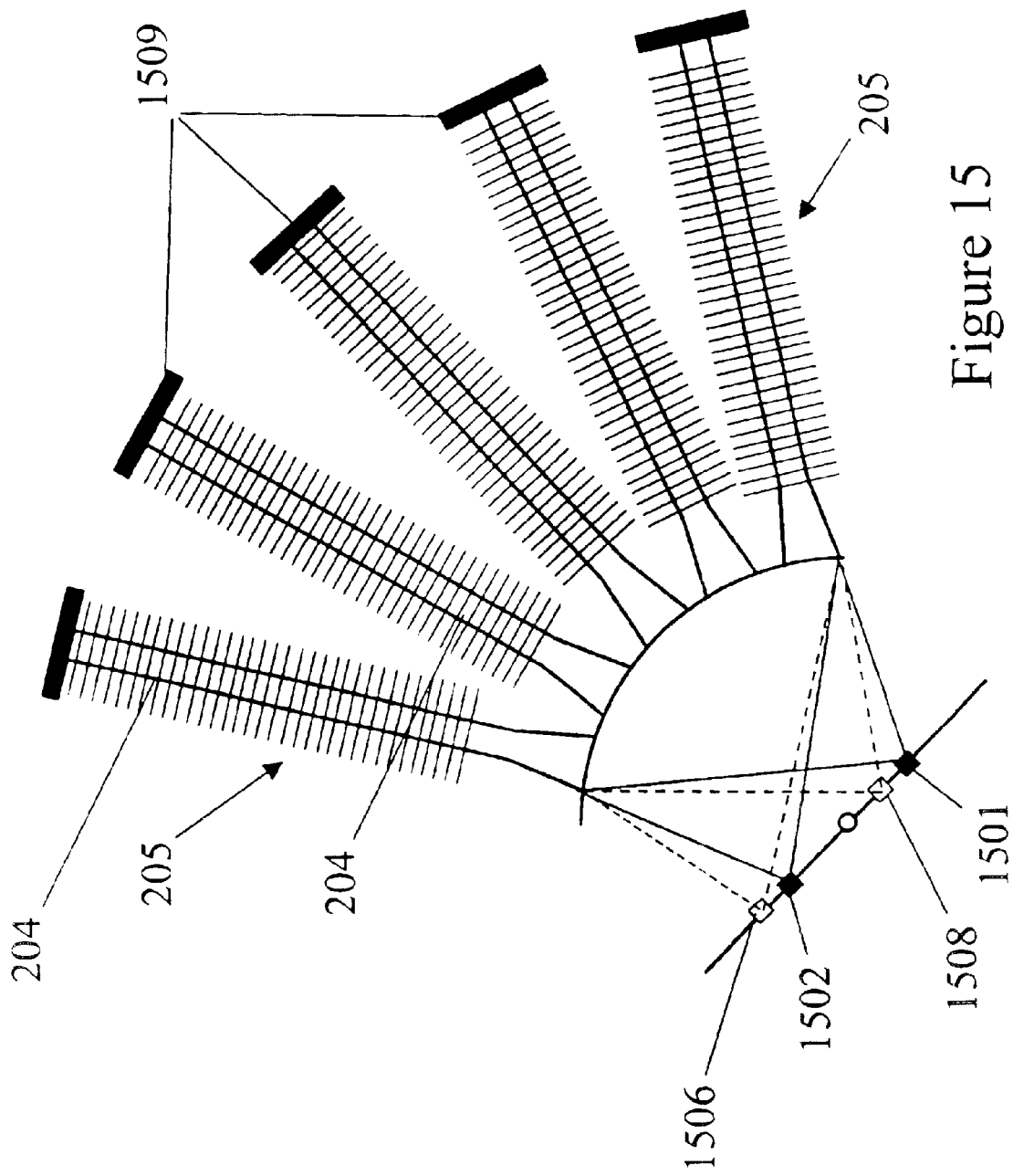
FIG. 15 is a schematic top view of an optical device with diffractive elements and channel waveguides.

The exemplary embodiment schematically illustrated in FIG. 15 may function as an add/drop multiplexer. An optical signal entering optical port 1501 and transmitted by diffractive element subsets 205 is routed to optical port 1502 by broadband reflectors 1509. An optical signal entering optical port 1501 and back-diffracted by diffractive element subsets 205 is routed to optical port 1506. An optical signal entering optical port 1508 and back-diffracted by diffractive element subsets 205 is routed to optical port 1502. In this way, so-called express optical channels may be routed between optical ports 1501 and 1502, an added optical channel may be routed between optical ports 1508 and 1502, while a dropped optical channel may be routed between optical ports 1501 and 1506. For each of the back-diffracted and transmitted portions of the optical signal, all of the modifications, adaptations, and/or arrangements disclosed hereinabove may be employed.

Figure 16:
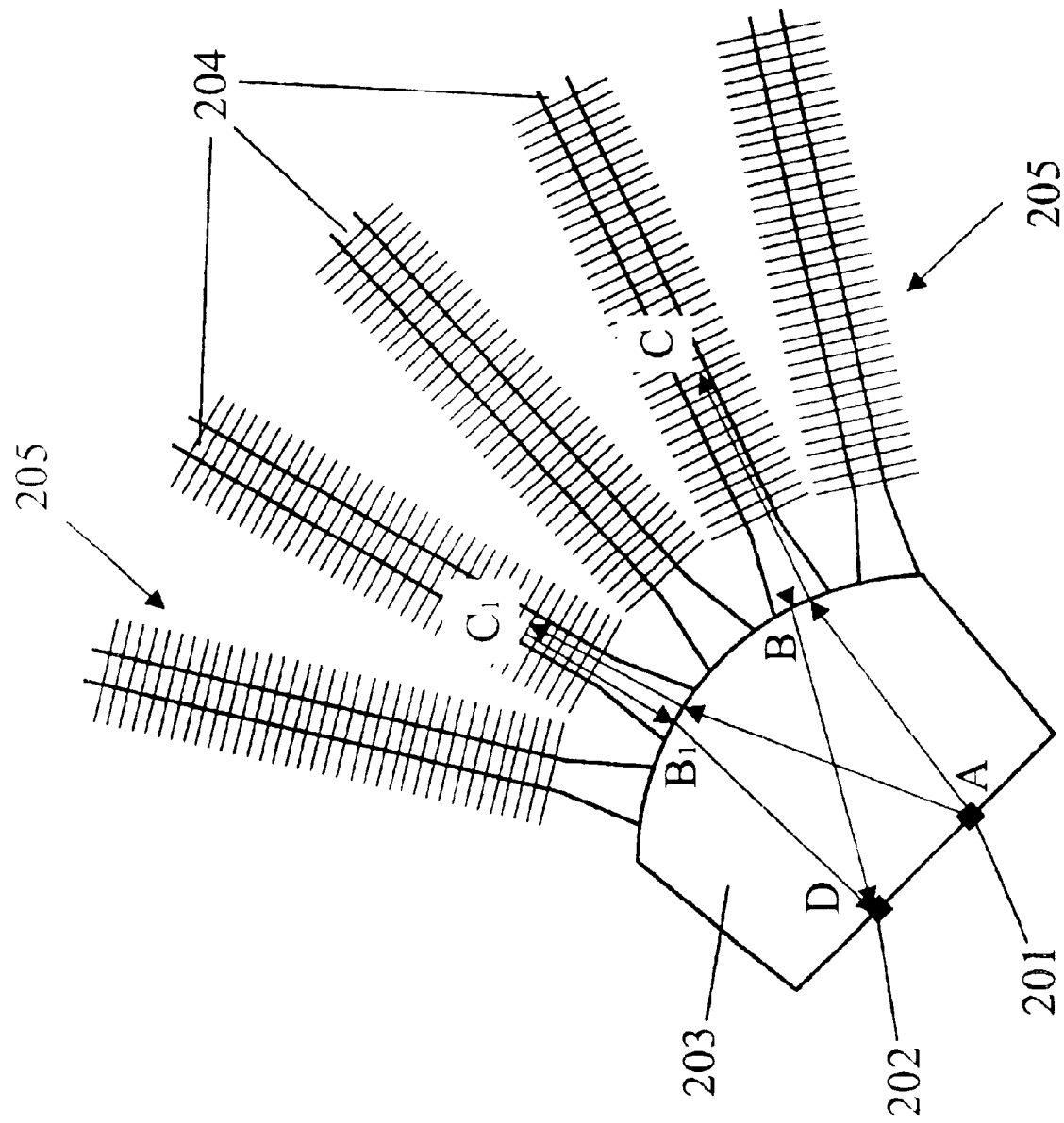
FIG. 16 is a schematic top view of an optical device with diffractive elements and channel waveguides.

Optical apparatus as disclosed herein may typically exhibit temperature-dependent spectral and/or temporal characteristics (such as a resonant wavelength), with specific temperature-dependent behavior depending on the geometries of the slab waveguide, of the channel waveguides, and of the diffractive elements, as well as the thermo-optical and thermo-mechanical properties of the materials comprising the apparatus. A spectral/temporal transfer function of the device may be obtained by coherently summing the electric fields diffracted from the diffractive elements in the channel waveguides. For a given vacuum wavelength λ, the resulting interference depends on relative phase Δϕ of portions of the optical signal back-diffracted from different diffractive elements. This is illustrated schematically in FIG. 16 (similar to FIG. 2). A portion of an incident optical signal is routed between optical ports 201 and 202 (points A and D, respectively) by back-diffraction from diffractive element subsets 205 in channel waveguides 204. Points of back-diffraction from two diffractive elements are represented by points C and $C_1$. Points B and $B_1$ designate the points where light is coupled into the channel waveguides 204 from the slab waveguide region 203 and then back into the slab waveguide region 203 after back-diffraction from the diffractive elements at points C and $C_1$ in the channel waveguides 204. The relative phase between light beams diffracted from points C and $C_1$ is calculated as:

$$\Delta\varphi = \frac{2\pi}{\lambda}((n_{slab}\overline{AB} + 2n_{channel}\overline{BC} + n_{slab}\overline{BD}) - \quad (1)$$

$$(n_{slab}\overline{AB_1} + 2n_{channel}\overline{B_1C_1} + n_{slab}\overline{B_1D})$$

or equivalently $$\Delta\varphi = \frac{2\pi}{\lambda}(n_{slab}\Delta L_{slab} + n_{channel}\Delta L_{channel}) \quad (2)$$

where $\Delta L_{slab}$ is difference in length between paths ABD and $AB_1D$, $\Delta L_{channel}$ is twice the difference in length between paths BC and $B_1C_1$, and $n_{slab}$ and $n_{channel}$ are the effective refractive indexes of the specific waveguide mode in, respectively, the slab waveguide region 203 and the channel waveguides 204. In some instances $\Delta L_{slab}$ is sufficiently small so as to be negligible, but will be retained in this general treatment. The effective modal indexes are a function of the detailed waveguide geometry as well as the bulk indices, $n_i$, of the materials comprising the waveguides.

The condition for constructive interference for a resonance wavelength, $\lambda_{res}$, between two light rays reflected from points C and $C_1$ within the channel waveguides is then given by $\Delta\varphi=2\pi m$, where m=1, 2, 3, . . . is an integer, yielding $$\lambda_{res} = \frac{1}{m}(n_{slab}\Delta L_{slab} + n_{channel}\Delta L_{channel}). \quad (3)$$

Dependence of $\lambda_{res}$ on temperature T is obtained by differentiating the above equation:

$$\frac{\partial \lambda_{res}}{\partial T} = \frac{1}{m}\left(\Delta L_{slab}\frac{\partial n_{slab}}{\partial T} + n_{slab}\frac{\partial \Delta L_{slab}}{\partial T} + \Delta L_{channel}\frac{\partial n_{channel}}{\partial T} + \quad (4)\right.$$

$$\left. n_{channel}\frac{\partial \Delta L_{channel}}{\partial T}\right)$$

$$= \frac{\Delta L_{slab}}{m}\left(\frac{\partial n_{slab}}{\partial T} + n_{slab}\alpha_{slab}\right) + \frac{\Delta L_{channel}}{m}\left(\frac{\partial n_{channel}}{\partial T} + n_{channel}\alpha_{channel}\right),$$

where $\lambda_{slab}$ ($\alpha_{channel}$) is an effective thermal expansion coefficient of the slab (channel) waveguide, $$\alpha = \frac{1}{\Delta L}\frac{\partial \Delta L}{\partial T}.$$

The Eq. 4 provides a rule for designing devices with a pre-programmed temperature dependence of $\partial\Lambda/\partial T$ (or other spectral or temporal characteristic). Substantially athermal operation is achieved when $\partial\Lambda/\partial T$ is zero.

For further analysis it may be assumed for simplicity that the path length difference $\Delta L_{slab}$ is zero, which is achieved, for example, when the slab waveguide region 203 has an axis of symmetry and the input and output ports are located at equal distances from the axis of symmetry. The more general case of a non-zero $\Delta L_{slab}$ may be treated in a manner analogous to what follows. In the $\Delta L_{slab}=0$ case, to achieve substantial independence of a resonance wavelength of the device from the temperature (the condition for substantially athermal operation), the following equation should be satisfied:

$$\left(\frac{\partial n_{channel}}{\partial T} + n_{channel}\alpha_{channel}\right) = 0. \quad (5)$$

If the channel waveguide is formed of k layers with uniform refractive index in each layer, then $n_{channel}$ is a function of the refractive indexes of all layers, i.e.

$$n_{channel}=n_{channel}(n_1,n_2, \ldots n_k). \quad (6)$$

The derivative of $n_{channel}$ with temperature can then be written generally as $$\frac{\partial n_{channel}(n_1, n_2, \ldots, n_k)}{\partial T} = \sum_{i=1}^{k}\varepsilon_i\frac{\partial n_i}{\partial T}, \quad (7)$$

where $$\varepsilon_i = \frac{\partial n_{channel}}{\partial n_i}. \quad (8)$$

The values of the $\varepsilon_i$ depend on all the material indices and the detailed channel waveguide geometry. The values of the $\varepsilon_i$ parameters can be determined by standard calculational algorithms known in the art. The values of $\partial n/\partial T$ are characteristic of the materials utilized in the construction of the channel waveguide structure. The condition for substantially athermal operation may be re-written as:

$$\sum_{i=1}^{k}\varepsilon_i\frac{\partial n_i}{\partial T} + n_{channel}\alpha_{channel} = 0. \quad (9)$$

It is seen that by choosing materials with appropriate values of $n_i$ and opposite signs of $\partial n/\partial T$ and adjusting the design parameters $\varepsilon_i$ by varying the thickness of the layers forming the channel waveguide, one can achieve substantial independence of the from the temperature of device spectral and/or temporal characteristics. Alternatively, it is possible to vary the depth, width (in the propagation direction), and spacing (i.e., diffractive order) of the diffractive elements (collectively, the diffractive element geometry) to adjust the design parameters q and achieve the desired temperature dependent characteristics of the device. For example, a first-order diffractive structure with diffractive-element width Λ/2 and period Λ may be changed to second order (i.e. with period approximately 2Λ), maintaining the same diffractive element width and operative device wavelength while altering the temperature dependence of the operative wavelength. It is also seen that these methods may be applied to set ∂λ/∂T to a designed value, thereby yielding an optical device with a programmed temperature dependence of its spectral and/or temporal characteristics.

Satisfying the athermal condition (Eq. 5 or Eq. 9) at some temperature within an operating temperature range does not necessarily ensure that the device will remain substantially athermal throughout that range. Both ∂n$_i$/∂T and $\epsilon_i$ may vary with temperature. Suitable choice of waveguide structure may be employed to balance the changes in ∂n$_i$/∂T against those in $\epsilon_i$ so as to reduce device temperature dependence over its operating range. The ∂n$_i$/∂T terms are set by material composition. The $\epsilon_i$ terms and their temperature dependences may be controlled by the geometry of the channel waveguide and/or the diffractive element geometry.

As seen from the condition for the athermal operation (Eq. 5 or 9), even if the materials comprising a planar waveguide optical device do not have opposite signs of the thermo-optical coefficient (∂n$_i$/∂T), it is still possible to design a substantially athermal device if terms involving $\epsilon_i$ and/or α have signs opposite the sign of the thermo-optical coefficient(s) of the material(s). Such an approach may be applicable in planar waveguides comprising various polymers and/or other materials where α and ∂n/∂T have opposite signs and comparable magnitudes. In addition, the thermal expansion term (α in Eqs. 5 and 9) may be adjusted using additional mechanical means to compensate for changes in the refractive indices. For example, a bimetallic plate may be secured to the substrate of a planar waveguide device to create additional temperature-dependent mechanical stress and/or strain. In the above examples, the value of α- for substantially athermal operation is defined by $$\alpha = -\left(\frac{1}{n_{channel}}\right)\sum_{i=1}^{k}\varepsilon_i\frac{\partial n_i}{\partial T}. \quad (10)$$

Further description of thermal compensation of the devices disclosed herein may be found in the references cited herein.

It should be noted that many of the embodiments depicted in this disclosure are only shown schematically, and that not all the features may be shown in full detail or in proper proportion. Certain features or structures may be exaggerated relative to others for clarity. In particular, it should be noted that the numbers of diffractive elements and channel waveguides in an actual device may typically be larger than that shown in the Figures. The numbers of diffractive elements and waveguides are reduced in the Figures for clarity. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

What is claimed is:

1. An optical apparatus, comprising an optical element having formed therein at least one set of diffractive elements and at least two channel optical waveguides, each channel optical waveguide having a corresponding first end and substantially confining in two transverse spatial dimensions an optical signal propagating therein, wherein:

diffractive elements of each set of diffractive elements are distributed among diffractive element subsets corresponding to each of at least two of the channel waveguides;

each diffractive element set routes, between a corresponding pair of optical ports, those corresponding portions of an optical signal propagating within the optical element that are received by at least two of the channel waveguides and back-diffracted within the receiving channel waveguides by corresponding diffractive element subsets;

the channel optical waveguides are arranged so that an optical signal entering the optical element at an input optical port first propagates through a region of the optical element between the input optical port and the first ends of the channel waveguides and is then incident on and received at least in part by the corresponding first ends of at least two of the channel optical waveguides; and the channel optical waveguides are arranged so that the corresponding routed portions of optical signal exiting the optical element at an output optical port first propagate through a region of the optical element between the first ends of the channel waveguides and the output optical port.

2. The apparatus of claim 1, wherein the diffractive element set imparts at least one of spectral characteristics and temporal characteristics onto the corresponding back-diffracted portions of the optical signal, thereby determining at least in part at least one of spectral characteristics and temporal characteristics of the routed portion of the optical signal.

3. The apparatus of claim 2, wherein corresponding resonance wavelengths for the corresponding back-diffracted portions of the optical signal are determined at least in part by longitudinal spacing of the diffractive elements of the corresponding subsets.

4. The apparatus of claim 3, wherein the longitudinal spacing is substantially constant over the diffractive element set.

5. The apparatus of claim 3, wherein the longitudinal spacing is substantially constant within each of the diffractive element subsets.

6. The apparatus of claim 3, wherein the longitudinal spacing varies over the diffractive element set.

7. The apparatus of claim 3, wherein the longitudinal spacing varies within each diffractive element subset.

8. The apparatus of claim 2, wherein the diffractive element set imparts spectral characteristics onto the back-diffracted portions of the optical signal, the optical apparatus thereby functioning as a spectral filter.

9. The apparatus of claim 8, wherein the optical apparatus functions as a multiplexer/demultiplexer.

10. The apparatus of claim 9, wherein:

the corresponding pair of optical ports comprise a multiplexing optical port and at least one of an input optical port and an output optical port;

wherein relative spatial arrangement of the first ends of the channel waveguides and corresponding relative phase shifts imparted on back-diffracted portions of the optical signal in the channel waveguides define at least in part a relative spatial arrangement of the multiplexing optical port and at least one of the input optical port and the output optical port;

at least two of the channel optical waveguides include corresponding broadband reflectors that provide substantial reflectivity over an operating wavelength range of the optical apparatus;

the broadband reflectors route, between the input optical port and the output optical port, those corresponding portions of an optical signal propagating within the optical element that are received by at least two of the channel waveguides, substantially transmitted by the diffractive element set, and redirected within the receiving channel waveguides by the corresponding broadband reflectors; and relative spatial arrangement of the first ends of the channel waveguides and corresponding relative phase shifts imparted on redirected portions of the optical signal in the channel waveguides define at least in part a relative spatial arrangement of the input optical port and the output optical port.

11. The apparatus of claim 9, wherein:

the corresponding pair of optical ports comprise a multiplexing optical port and at least one of an input optical port and an output optical port;

wherein relative spatial arrangement of the first ends of the channel waveguides and corresponding relative phase shifts imparted on back-diffracted portions of the optical signal in the channel waveguides define at least in part a relative spatial arrangement of the multiplexing optical port and at least one of the input optical port and the output optical port;

at least two of the channel waveguides route, between the input optical port and the output optical port, those corresponding portions of an optical signal propagating within the optical element that are received by at least two of the channel waveguides, substantially transmitted by the diffractive element set, and emitted from corresponding second ends of the routing channel waveguides; and relative spatial arrangement of the first ends of the channel waveguides, relative spatial arrangement of the second ends of the channel waveguides, and corresponding relative phase shifts imparted on transmitted portions of the optical signal in the channel waveguides define at least in part a relative spatial arrangement of the input optical port and the output optical port.

12. The apparatus of claim 2, wherein the diffractive element subsets impart substantially the same characteristics onto the corresponding back-diffracted portions of the optical signal.

13. The apparatus of claim 2, wherein the diffractive element subsets impart differing characteristics onto the corresponding back-diffracted portions of the optical signal.

14. The apparatus of claim 2, wherein at least one of amplitude and phase of sub-portions, diffracted by single diffractive elements, of the corresponding back-diffracted portions of the optical signal is controlled by at least one of relative positioning of the individual diffractive elements and configuration of the individual diffractive elements.

15. The apparatus of claim 2, wherein the diffractive element set imparts temporal characteristics onto the corresponding back-diffracted portions of the optical signal, the optical apparatus thereby functioning as a temporal encoder.

16. The apparatus of claim 1, wherein relative spatial arrangement of the first ends of the channel waveguides and corresponding relative phase shifts imparted on back-diffracted portions of the optical signal in the channel waveguides define at least in part a relative spatial arrangement of the corresponding pair of optical ports.

17. The apparatus of claim 16, wherein:

at least two of the channel waveguides route, between another corresponding pair of optical ports, those corresponding portions of an optical signal propagating within the optical element that are received by at least two of the channel waveguides, substantially transmitted by the diffractive element set, and emitted from corresponding second ends of the routing channel waveguides; and wherein relative spatial arrangement of the first ends of the channel waveguides, relative spatial arrangement of the second ends of the channel waveguides, and corresponding relative phase shifts imparted on transmitted portions of the optical signal by the channel waveguides define at least in part a relative spatial arrangement of the other corresponding pair of optical ports.

18. The apparatus of claim 17, wherein at least one channel waveguide includes a phase modulator that at least partly determines the corresponding phase shifts imparted on transmitted portions of the optical signal.

19. The apparatus of claim 18, wherein the relative spatial arrangement of the other corresponding pair of optical ports shifts in response to a control signal applied to the phase modulator.

20. The apparatus of claim 17, wherein at least one channel waveguide includes a corresponding static phase-shifting element that at least partly determines the corresponding phase shifts imparted on transmitted portions of the optical signal.

21. The apparatus of claim 17, wherein corresponding lengths of the corresponding channel waveguides at least partly determine the corresponding phase shifts imparted on transmitted portions of the optical signal.

22. The apparatus of claim 17, wherein the corresponding second ends of the channel waveguides are structurally adapted for optical coupling with one optical port of the other corresponding pair of optical ports.

23. The apparatus of claim 17, wherein the first pair of optical ports comprises an input port and a dropped-channel port, the other pair of optical ports comprises the input port and an output port, and the apparatus functions as a channel-dropping demultiplexer.

24. The apparatus of claim 17, wherein the first pair of optical ports comprises an added-channel port and an output port, the other pair of optical ports comprises an input port and the output port, and the apparatus functions as a channel-adding multiplexer.

25. The apparatus of claim 16, wherein:

at least two of the channel optical waveguides include corresponding broadband reflectors that provide substantial reflectivity over an operating wavelength range of the optical apparatus;

the broadband reflectors route, between another corresponding pair of optical ports, those corresponding portions of an optical signal propagating within the optical element that are received by at least two of the channel waveguides, substantially transmitted by the diffractive element set, and redirected within the receiving channel waveguides by the corresponding broadband reflectors; and wherein relative spatial arrangement of the first ends of the channel waveguides and corresponding relative phase shifts imparted on redirected portions of the optical signal in the channel waveguides define at least in part a relative spatial arrangement of the other corresponding pair of optical ports.

26. The apparatus of claim 25, wherein at least one channel waveguide includes a phase modulator that at least partly determines the corresponding phase shifts imparted on redirected portions of the optical signal.

27. The apparatus of claim 26, wherein the relative spatial arrangement of the other corresponding pair of optical ports shifts in response to a control signal applied to the phase modulator.

28. The apparatus of claim 25, wherein the corresponding longitudinal positions of the broadband reflectors along the corresponding channel waveguides at least partly determine the corresponding phase shifts imparted on redirected portions of the optical signal.

29. The apparatus of claim 25, wherein at least one channel waveguide includes a corresponding static phase-shifting element that at least partly determines the corresponding phase shifts imparted on redirected portions of the optical signal.

30. The apparatus of claim 25, wherein the first pair of optical ports comprises an input port and a dropped-channel port, the other pair of optical ports comprises the input port and an output port, and the apparatus functions as a channel-dropping demultiplexer.

31. The apparatus of claim 25, wherein the first pair of optical ports comprises an added-channel port and an output port, the other pair of optical ports comprises an input port and the output port, and the apparatus functions as a channel-adding multiplexer.

32. The apparatus of claim 16, wherein at least one channel waveguide includes a phase modulator that at least partly determines the corresponding imparted phase shifts.

33. The apparatus of claim 32, wherein the relative spatial arrangement of the corresponding optical ports shifts in response to a control signal applied to the phase modulator.

34. The apparatus of claim 16, wherein the corresponding longitudinal positions of the diffractive element subsets along the corresponding channel waveguides at least partly determine the corresponding imparted phase shifts.

35. The apparatus of claim 16, wherein at least one channel waveguide includes a corresponding static phase-shifting element that at least partly determines the corresponding imparted phase shifts.

36. The apparatus of claim 1, further comprising multiple diffractive element sets, diffractive elements of each set of diffractive elements being distributed among diffractive element subsets corresponding to each of at least two of the channel waveguides, each diffractive element set imparting at least one of spectral characteristics and temporal characteristics onto the corresponding back-diffracted portions of the optical signal, thereby determining at least in part at least one of spectral characteristics and temporal characteristics of the corresponding routed portions of the optical signal.

37. The apparatus of claim 36, wherein at least two of the multiple diffractive element sets are interleaved among multiple of the channel waveguides.

38. The apparatus of claim 37, wherein each channel waveguide has at most one subset of diffractive elements.

39. The apparatus of claim 36, wherein at least two sets of diffractive elements impart distinct characteristics onto their respective back-diffracted portions of the optical signal.

40. The apparatus of claim 36, wherein at least two of the multiple diffractive element sets are overlaid.

41. The apparatus of claim 36, wherein at least two of the multiple diffractive element sets are stacked.

42. The apparatus of claim 36, wherein at least two of the multiple diffractive element sets are interleaved within at least one common channel waveguide.

43. The apparatus of claim 16, wherein the corresponding first ends of the channel waveguides are structurally adapted for optical coupling with the corresponding pair of optical ports.

44. The apparatus of claim 43, wherein the corresponding first ends of the channel waveguides are flared.

45. The apparatus of claim 43, wherein the corresponding first ends of the channel waveguides are tapered.

46. The apparatus of claim 43, wherein the corresponding first ends of the channel waveguides have segmented cores.

47. The apparatus of claim 43, wherein end faces of the corresponding first ends of the channel waveguides are curved.

48. The optical apparatus of claim 1, wherein regions of the optical element between optical ports and the first ends of the channel waveguides comprise at least one slab optical waveguide, the slab waveguide substantially confining in one transverse spatial dimension an optical signal propagating in two dimensions therein.

49. The optical apparatus of claim 2, wherein the slab waveguide comprises a core layer surrounded by lower-index cladding layers.

50. The optical apparatus of claim 2, wherein the slab waveguide and the channel waveguides are formed on a common substrate.

51. The apparatus of claim 1, wherein routing of the back-diffracted portions of the optical signal exhibits a designed dependence on polarization of the optical signal.

52. The apparatus of claim 51, wherein routing of the back-diffracted portions of the optical signal is substantially independent of the polarization of the optical signal.

53. The apparatus of claim 1, wherein routing of the back-diffracted portions of the optical signal exhibits a designed dependence on temperature of the optical element over an operating temperature range.

54. The apparatus of claim 53, wherein routing of the back-diffracted portions of the optical signal is substantially independent of the temperature of the optical element over an operating temperature range.

55. The optical apparatus of claim 1, wherein an optical signals propagate in three dimensions in regions of the optical element between optical ports and the first ends of the channel waveguides.

56. The apparatus of claim 1, wherein routing of the back-diffracted portions of the optical signal includes conjugate-ratio imaging of one of the corresponding pair of optical ports onto the other of the corresponding pair of optical ports.

57. The apparatus of claim 1, wherein routing of the back-diffracted portions of the optical signal includes propagation between the ends of the channel waveguides and at least one of the corresponding pair of optical ports as an optical mode substantially collimated in an unconfined transverse dimension.

58. The apparatus of claim 1, further comprising a second similar optical element having formed therein at least one set o diffractive elements and at least two channel optical waveguides, wherein an output optical port of the first optical element serves as an input optical source for an input optical port of the second optical element.

\* \* \* \* \*